United States Patent [19]
Samph et al.

[11] Patent Number: 5,204,813
[45] Date of Patent: Apr. 20, 1993

[54] COMPUTER-CONTROLLED TESTING PROCESS AND DEVICE FOR ADMINISTERING AN EXAMINATION

[75] Inventors: Thomas Samph, Philadelphia, Pa.; Metro Sauper; Edwin J. Price, both of Sewell, N.J.; Kevin Light, Myerstown, Pa.

[73] Assignee: Assessment Systems, Inc., Philadelphia, Pa.

[21] Appl. No.: 535,311

[22] Filed: Jun. 8, 1990

[51] Int. Cl.$^5$ .............................................. G06F 15/00
[52] U.S. Cl. ..................................... 364/419; 434/350; 434/362; 434/323
[58] Field of Search ................. 364/419, 200; 434/310, 434/323, 327, 335, 350, 356, 362

[56] References Cited

U.S. PATENT DOCUMENTS

| | | | |
|---|---|---|---|
| 4,486,180 | 12/1984 | Riley | 434/65 |
| 4,587,630 | 5/1986 | Straton | 364/900 |
| 4,820,167 | 4/1989 | Nobles et al. | 434/336 |
| 4,873,623 | 10/1989 | Lane et al. | 364/188 |
| 4,899,292 | 2/1990 | Montagna et al. | 364/521 |
| 4,928,094 | 5/1990 | Smith | 340/712 |
| 4,970,655 | 11/1990 | Winn et al. | 235/381 |

OTHER PUBLICATIONS

Tandy 2800 User's Guide ©1989.
"KEYWAY" Brochure Copyright 1985 Educational Testing Service.
"Tablet: Personal Computer in the Year 2000", vol. 31, No. 6 of Jun. 1988 issue of Communications of the ACM B. W. Mel et al.
"DFM Unveils 3½-Pound Hand-Held PC" Patricia J. Pane.

Primary Examiner—Roy N. Envall, Jr.
Assistant Examiner—A. Bodendorf
Attorney, Agent, or Firm—Dann, Dorfman, Herrell and Skillman

[57] ABSTRACT

A computer-controlled portable testing device and process are provided for administering a test to a user. The testing device includes an information storage medium for storing information such as test questions and the user's answers to the test questions. The test questions may include screening questions directed to the character of the user as part of a licensing issuing process and the user's answers will include answers to the screening questions. A display on the device displays information such as the test questions from the information storage medium to the user. A touch screen on the device enables the user to input selected predetermined input information by touching entry pads displayed on the display. A microprocessor is provided to control the transfer of information between the information storage medium, the display and the touch screen. An internal power source supplies power for the device. Pursuant to the computer executed process, a test item is displayed on the display. Each test item includes a question, associated answer-options to the test question, and answer entry pads corresponding to the answer-options. Once an entry pad has been touched, the answer-option corresponding to such answer entry pad is stored in a response file in the information storage medium. Function entry pads are also displayed to control the display of information. Function entry pads enable specific questions to be marked for later review and also enable the subsequent review of skipped questions.

42 Claims, 22 Drawing Sheets

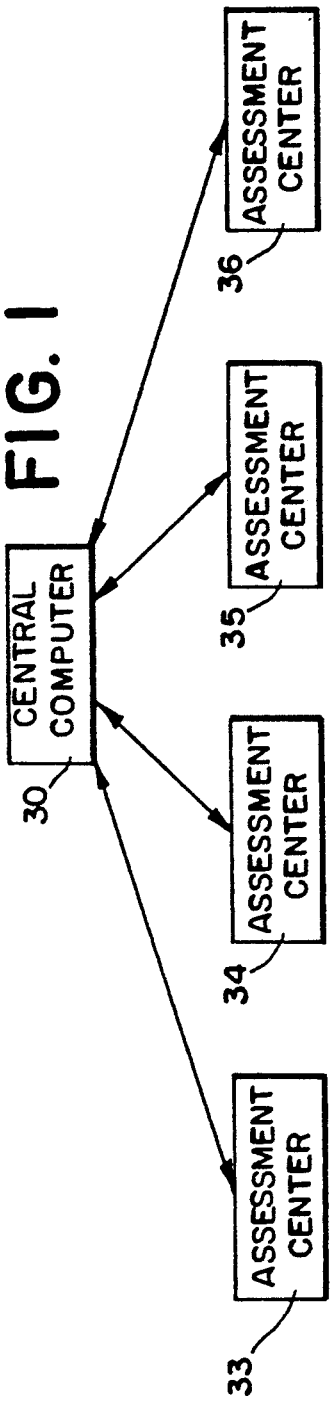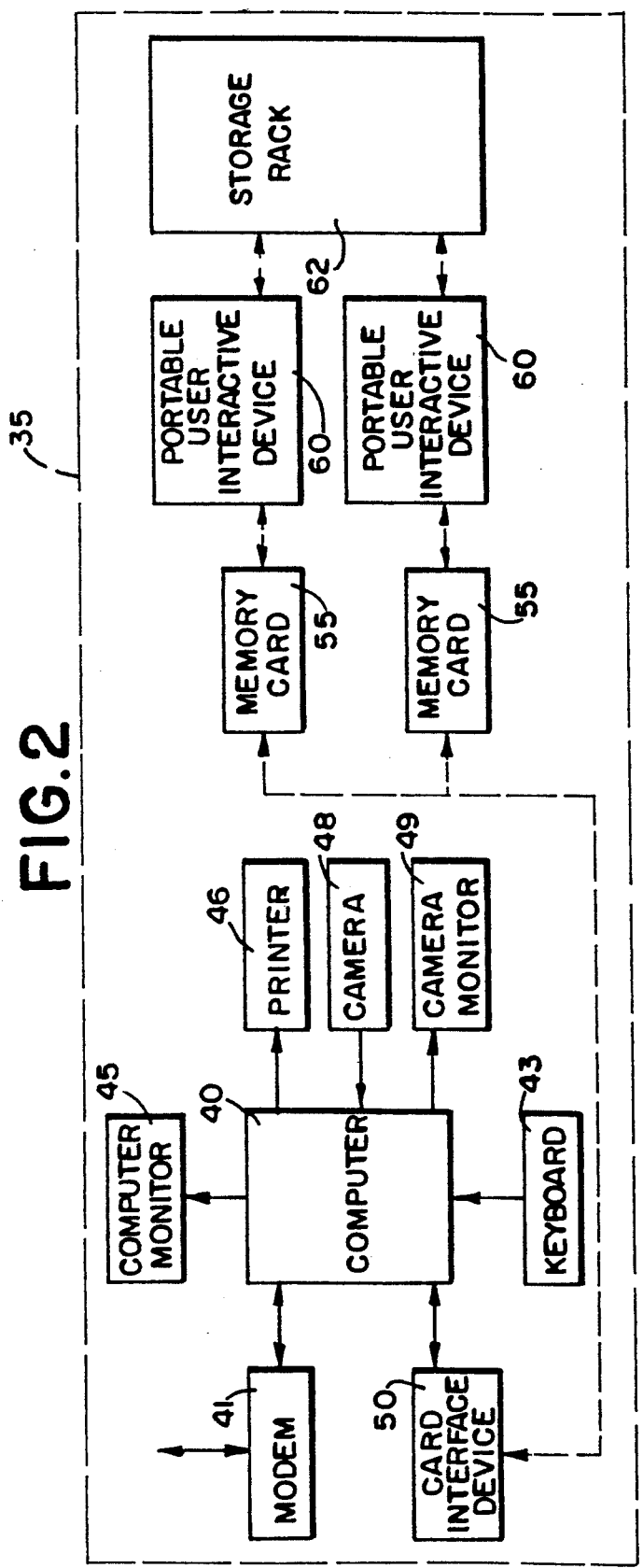

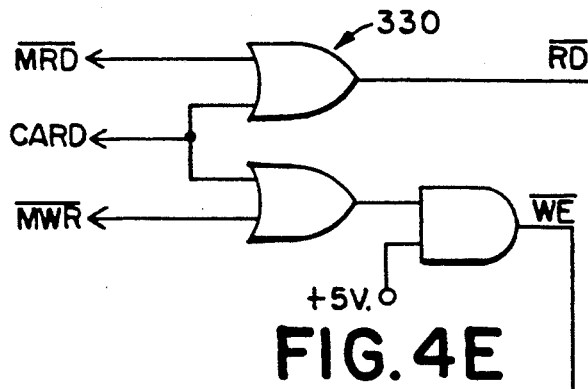
FIG. 4E
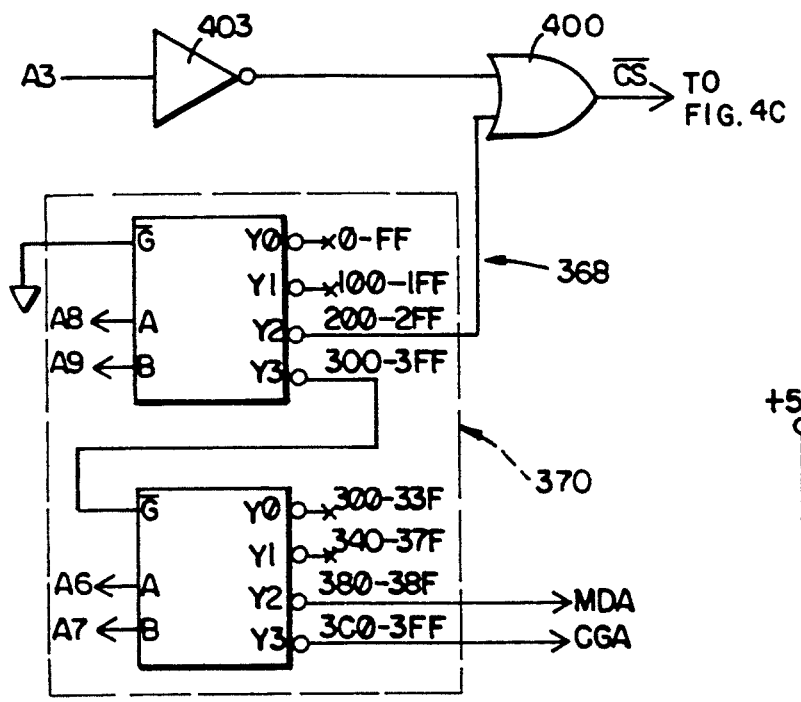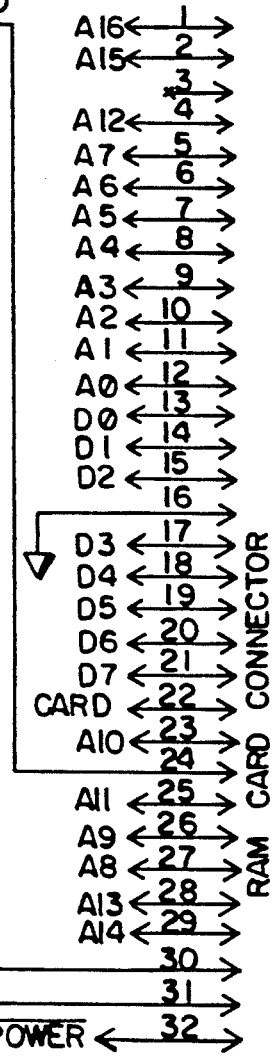
FIG. 4D

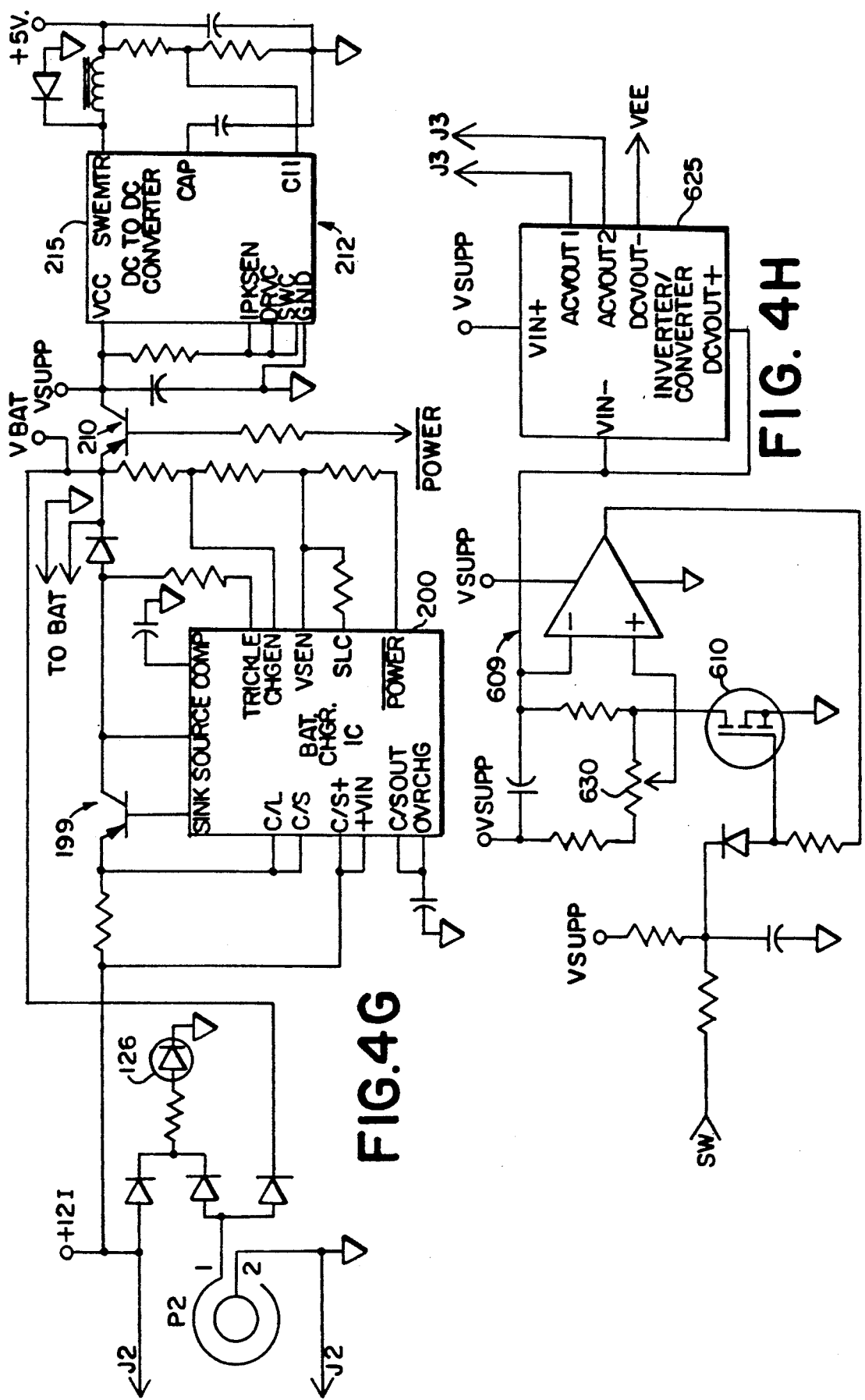

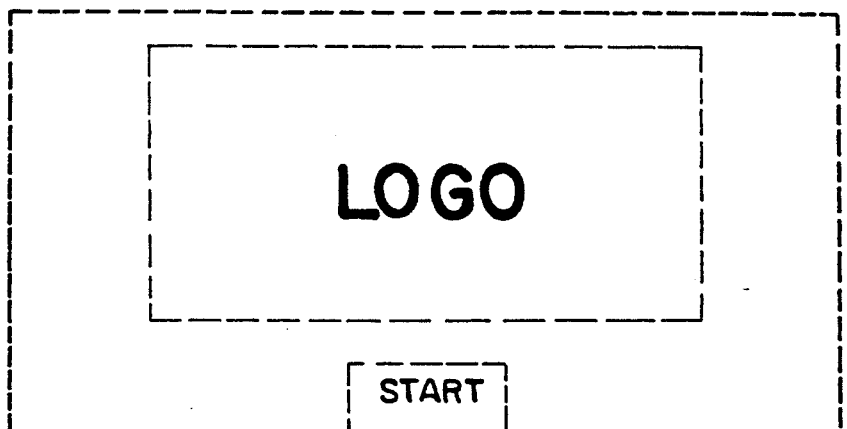
FIG. 6A
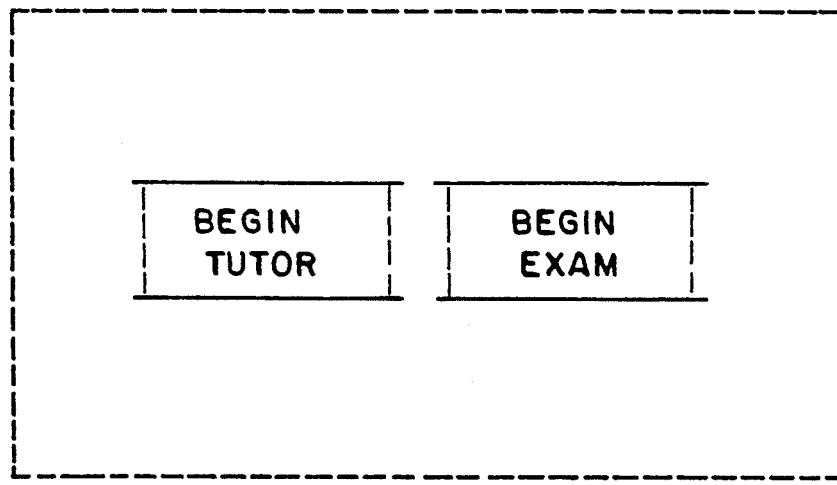
FIG. 6B
|  | GEN'L | ST | TOT. |
|---|---|---|---|
| QUESTIONS ANSW'D: | 50 | 30 | 80 |
| QUESTIONS OMIT'D: | 0 | 0 | 0 |
| TOTAL # QUES: | 50 | 30 | 80 |
| # MARKED FOR REV'W: | 6 | 2 | 8 |
| 7 | 8 | 9 |
| 4 | 5 | 6 |
| 1 | 2 | 0 |
| | 0 | |
| review marked items | review unanswd. items | review entire exam. | go to item | end exam. |
FIG. 6G

ID: ____

| 7 | 8 | 9 |
| 4 | 5 | 6 |
| 1 | 2 | 3 |
| 0 |

FIG. 6C

N. [ TEXT OF QUESTION ]

[ A ]  [ ANSWER OPTIONS
[ B ]     . . .
[ C ]     . . .
[ D ]     . . . ]

summy. screen

| mark for review | prev. item | next item | next page | previous page |

FIG. 6F

N. [ . . .
TEXT OF QUESTION
. . . ]

[YES]     [NO]

| prev. item | next item |

FIG. 6D

QUESTIONS ANSWERED:      10

QUESTIONS OMITTED:       0

TOTAL # QUESTIONS:       10

| review | review unansd. | start exam. |

FIG. 6E

COMPUTER-CONTROLLED TESTING PROCESS AND DEVICE FOR ADMINISTERING AN EXAMINATION

FIELD OF THE INVENTION

The present invention relates to a computer-controlled testing process and device for administering an examination to a user and, more particularly, to a computer-controlled testing device and process for administering an examination to an examinee on a portable, microprocessor-controlled testing device having an information recording medium to store information, a display to permit the display of output information, and an input in the form of a touch screen cooperating with the display to enable to the input of predetermined input information.

BACKGROUND OF THE INVENTION

In virtually every profession, a candidate is required to exhibit at least a threshold level of proficiency before being issued a license to engage in the practice of the profession. Typically, a candidate is required to take and pass a written qualifying examination administered by a licensing authority. Successful completion of the examination by the candidate leads to the issuance of the requisite license.

Once a candidate has gained entry into a profession, testing does not necessarily come to an end. Maintaining competency levels of practicing professionals is rapidly becoming a significant issue. In certain professions, merely passing an initial qualifying examination is not enough. Additional testing is used to ensure continued competency. As a result, programs are frequently proposed to require even licensed professionals to take and pass periodic competency examinations in order to maintain existing licenses and certifications.

Various federal and state licensing agencies and authorities have been empowered to control the issuance and maintenance of a myriad of professional licenses. As part of their licensing function, such agencies and authorities are mandated with the task of overseeing the administration of the qualification and competency examinations.

Generally the process of administering an examination, reviewing the test results, and issuing licenses to qualified candidates extends over a period of several months. Delays in administering and processing examinations have become almost routine. A contributing factor to the delay is the inefficiency of the conventional examination procedure. The conventional examination process has become somewhat antiquated. Administering examinations by a process which employs preprinted application forms, paper examinations, preprinted paper answer sheets, and printed test results is both costly and burdensome. The test related documents must be printed, stored, and transported to and from various testing locations. Obviously, such a system involves rather significant handling costs. Additionally, the time delay involved in administering such an examination becomes burdensome on all persons involved.

Employers in need of qualified personnel are often forced to wait months to make hiring decisions. Job offers are often deferred until potential candidates receive their test results. This not only inconveniences employers but the candidates as well. Most certainly, the candidates desire to obtain test results as promptly as possible. The time period between the completion of a test and the receipt of the test results is almost always fraught with stress and uncertainty. More efficient testing procedures are certainly desirable. Even the testing agencies and authorities stand to benefit by testing procedures which minimize paper handling and reduce staff work loads.

One approach to solve such problems has been the use of a computer-controlled answer pad. With such a device, tests are administered at a testing center through the use of conventional printed examinations. However, the candidate's answers to the examination are recorded with the computer-controlled answer pad. While this system has served to somewhat expedite the testing procedure, drawbacks still exist. For example, costs are still incurred in the printing, storing and handling of the printed examinations. In addition, security is still a factor when large amounts of printed examinations must be stored and then transported to and from numerous testing sites. Further reductions in paper handling and associated costs are needed.

In accordance with the present invention, a highly efficient and cost effective system has been developed. As part of the system, a portable, microprocessor-controlled user interactive device is utilized.

SUMMARY OF THE INVENTION

In accordance with the present invention, a computer-controlled testing process and device are provided. The testing device is in the form of a portable, microprocessor-controlled unit for administering a test to a user and for processing and displaying information.

The testing device includes an information storage medium for storing information such as test questions and the answers of the user to the test questions. To facilitate the licensing process, the test questions may include screening questions of the type relating to the user's character, such as inquiries about criminal convictions and/or license revoctions. Likewise, the answers of the user to the test questions may include the user's answers to the screening questions.

The testing device enables the transfer of information relative to the information storage medium. Preferably, the information storage medium is in the form of a memory module or card which is removable from the device. For this purpose, the testing device includes a port for removably receiving the information storage medium.

A display on the device cooperates with the information storage medium to display information. For example, the display functions to display information such as the test questions from the information storage medium to the user. User entry pads may also be displayed at predetermined locations on the display for use in permitting the user to input predetermined information to the information storage medium. Each user entry pad corresponds to respective predetermined input information.

An input on the testing device cooperates with the information storage medium to enable the user to input information to the information storage medium. For example, the input enables the user to input answers to the test questions. The input is preferably in the form of a touch screen which cooperates with the display and the information storage medium to enable the user to input selected predetermined input information to the information storage medium. The input of information is effected when the user touches the touch screen at a selected user entry pad while such entry pad is displayed on the display. As a result of the touching, the predetermined input information corresponding to such entry pad is input to the information storage medium.

A microprocessor cooperates with the information storage medium, the display, and the touch screen for controlling the transfer of information relative to the information storage medium, the display and the touch screen. An internal power source is included within the device for supplying the power for the operation of the device.

The computer-controlled process for administering the examination is executed on the portable, microprocessor-controlled testing device. The examination is stored in a test file on the information storage medium. The examination includes a plurality of questions arranged in a selective order and at least two answer-options associated with each of the questions.

As part of the computer executed process, a test item is displayed on the display of the testing device. The test item includes a question, the associated answer-options, and answer entry pads corresponding to the answer-options. The test-item may be directed to substantive exam questions or may include screening questions for the licensing process.

After a test item is displayed on the display, it is then determined whether one of the answer entry pads has been touched by the user on the touch screen. Once an answer entry pad is touched, the answer-option corresponding to such answer entry pad is stored in a response file in the information storage medium.

In addition to answer entry pads, function type entry pads are also displayed on the display. The function entry pads enable the user to perform various functions to facilitate the taking of the examination. Such functions may include permitting the user to review a previous test item or to advance to the next test item. Other functions enable the user to review a previous page of a particular test item or to advance to the next page of a particular test item. Still other functions permit the user to mark selected test items for later review and to thereafter enable the user to effect such later review of the marked test items.

BRIEF DESCRIPTION OF THE DRAWINGS

The foregoing summary as well as the following detailed description of the preferred embodiments of the present invention will be better understood when read in conjunction with the accompanying drawings, in which:

FIG. 1 is an overall block diagram of a computer-controlled testing and licensing system in which a central computer communicates with a plurality of separate assessment centers at which examinations are administered;

FIG. 2 is a block diagram of an assessment center having a computer-controlled registration station incorporating a plurality of portable user interactive devices for administering a test to individual users at the assessment center;

FIGS. 4A through 4I are schematic representations of the circuitry of a CPU board employed in the portable user interactive device;

FIG. 6A is a representation of the starting screen displayed by the portable user interactive device;

FIG. 6B is a representation of a tutorial/exam selection screen displayed by the portable user interactive device;

FIG. 6C is a representation of an identification number entry screen displayed by the portable user interactive device;

FIG. 6D is a representation of a screening question display screen as displayed by the portable user interactive device;

FIG. 6E is a representation of a screening question summary screen as displayed by the portable user interactive device;

FIG. 6F is a representation of an exam question display screen displayed by the portable user interactive device;

FIG. 6G is a representation of an exam question summary screen displayed by the portable user interactive device.

DETAILED DESCRIPTION OF THE PREFERRED EMBODIMENTS

Figure 3:
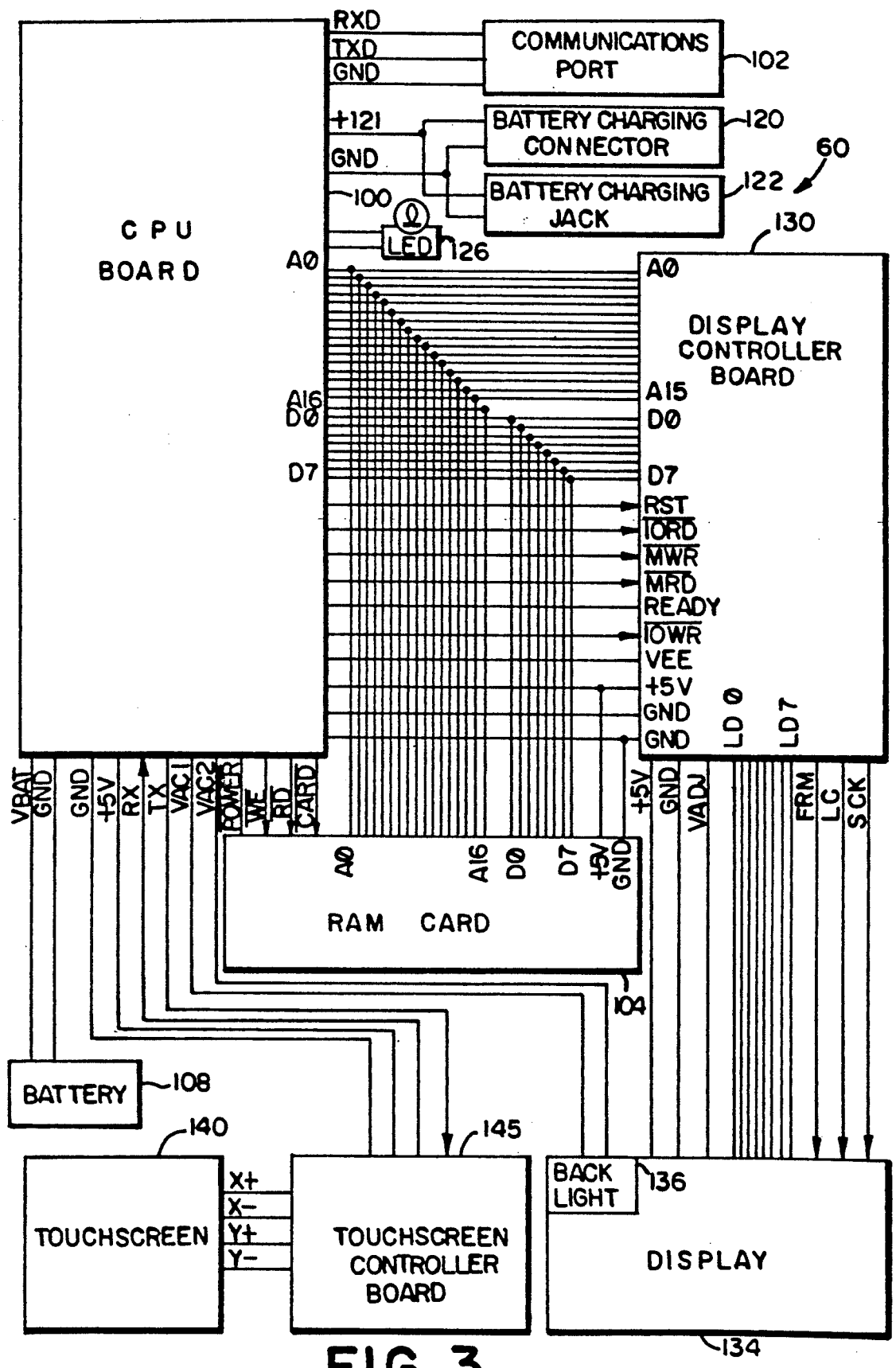
FIG. 3 is a schematic representation of the circuitry employed in a portable user interactive device.

Referring to FIG. 1, a computer-controlled system for administering examinations to a plurality of candidates at various assessment centers 33, 34, 35 and 36 is depicted. The central computer 30 provides centralized storage of testing and registration information and controls at least on a general level the overall operation of the testing system. The assessment centers are the specific sites established for the administration of an examination to the candidates. The assessment centers may be permanent or temporary facilities.

For any particular examination, candidates may register to take the examination with the test administrator responsible for the examination. Registration information is stored in the central computer 30 of the test administrator. The central computer 30 communicates with the individual assessment centers 33, 34, 35, and 36 typically via a modem in order to transfer information to and from the assessment centers. For purposes of security, information is encoded prior to transfer.

Referring to FIG. 2, an individual assessment center 35 includes a registration station having a personal computer 40 which generally controls registration and test administration at the assessment center 35. The personal computer 40 is connected via modem 41 with the central computer 30. The personal computer 40 includes a conventional keyboard 43, computer monitor 45, and printer 46 for use by a test proctor at the assessment center. In a specific embodiment, the personal computer 40 may also include a video camera 48 and a camera monitor 49 to permit the proctor to record an image of a candidate. Preferably, the camera functions to permit an image to be recorded as digital information. The recording of visual images is useful in administering the examination because it enables the proctor to obtain more reliable identification and verification of candidates. The recorded images may also be used in issuing a photo-identification license when a particular candidate passes an examination.

At the assessment center 35, a plurality of microprocessor-controlled portable user interactive devices 60 are provided so that a separate device 60 is available for each candidate. On the day of the examination, each candidate is assigned to use a respective rechargeable portable user interactive device 60 to take the examination. Prior to use, the individual portable user interactive devices 60 are stored in a storage rack 62 at the assessment center 35. The storage rack 62 is adapted to recharge the portable user interactive devices while the devices are in storage. The portable user interactive device 60 includes an information recording medium in the form of a memory module such as a RAM memory card 55 which is used for storing selected information for the examination. As shown in FIG. 2, the memory card 55 is removably connectable with the portable user interactive device 60 to permit information to be transferred between the memory card and the device. Likewise, the personal computer 40 includes a card interface device 50 which functions to operably connect with the memory card 55 in order to enable the transfer of information between the personal computer 40 and the memory card 55. As such, the memory card 55 functions as an external information storage medium for both the personal computer and the portable user interactive device.

When a test is to be administered, candidate registration files for that test are downloaded from the central computer 30 to the personal computer 40 at each respective assessment center. The downloaded information typically includes candidate identification and demographic information collected over the phone or from written applications during the registration process. The specific examination to be administered is also downloaded from the central computer to the personal computer 40 at each assessment center. In specific embodiments, the downloaded information may also include screening questions used for the issuance of licenses to successful cnadidates and historical information such as the number of times a particular examination has previously been taken by a candidate. Other information such as the fees due, the form of an examination, and the amount of time permitted for taking the particular examination is also typically downloaded to the personal computer 40.

At the beginning of a test day, the test proctor at the assessment center uses the personal computer 40 to print a roster of candidates on the printer 46. As candidates appear to take the examination, each candidate presents the proctor with a completed application and pays any required fee for taking the examination. The proctor then verifies the identity of the candidate and confirms the accuracy of the candidate's computerized registration file. Thereafter, the proctor produces a digitized image of the candidate by using the camera 48 and the camera monitor 49. The digitized photo image of the candidate is then stored in the candidate's respective computerized file.

The memory card 55 from the portable user interactive device 60 which has been assigned to the candidate is removed and inserted into the card interface device 50. The requisite information for administering the examination is then loaded from the computer 40 onto the memory card 55 through the card interface device 50. The information loaded onto the memory card will typically include the candidate's identification number and an examination file which includes the examination to be given to the candidate. Where applicable, screening questions used in the licensing process will also be loaded onto the memory card 55. Screening questions typically seek relevant information about the candidate such as level of academic achievement, potential criminal history such as felony convictions, and character information including past license revocations or suspensions.

After the requisite information has been recorded onto the memory card 55, the memory card is removed from the card interface device 50 and inserted into a receiving port on the candidate's portable user interactive device 60. The portable user interactive device 60 is a portable, microprocessor-controlled device which functions to administer the examination to the candidate. The device displays the questions to the candidate. The device also has answer entry pads that enable the candidate to input to the device the candidate's answers to the questions including answers to the screening questions. The candidate's answers to the examination questions, including the screening questions, are recorded on the memory card 55.

The portable user interactive device 60 is powered by an internal power source which includes a rechargeable battery 108. The internal power source enables the candidate to carry the device to any predetermined location in the assessment center 35 to take the examination. The device also includes a display 134 which cooperates with the memory card 55 to display information to the candidate. For example, the test questions are displayed to the user during the administration of the examination. A user input in the form of a touch screen 140 cooperates with the display 134 to enable the candidate to input information such as the answers of the user to various test questions, including the answers of the user to the screening questions, onto the memory card 55, preferably in the form of RAM card 104.

After the candidate has completed the examination, the portable user interactive device 60 is returned to the proctor at the registration station. The memory card 55 is removed from the portable user interactive device 60 by the proctor and inserted into the card interface device 50. Information from the memory card 55 is transferred to the personal computer 40.

After the transfer of the information from the memory card 55 to the personal computer 40 is completed, the personal computer 40 causes a background report to be printed at the printer 46. The background report includes a list of the screening questions together with the applicant's responses to such questions. In addition, the report also contains demographic information about the candidate as well as, if desired, a photo of the candidate. A signature line is provided so that the candidate can sign the background report to verify the applicant's responses to the screening questions.

The personal computer includes a conventional memory which stores an answer key which provides the correct answers to the examination and a comparison procedure which enables the computer to compare the answer key with the answers of each respective candidate. From the comparison procedure, the computer produces a score report which includes the test results of the respective candidate. The score report is then printed on the printer 46. The score report not only provides the candidate with the test results but with any other information required in the licensing process. For example, certain jurisdictions permit immediate licensing of qualified candidates who have passed the examination. In these immediate-licensing jurisdictions, the system is capable of producing the successful candidate's license on printer 46. The candidate's license may include a digitized photo of the candidate. The issuance of the license by the system is controlled by a license issuing procedure stored in the memory of the personal computer. Other jurisdictions permit immediate scoring but require delayed issuance of licenses. In these delayed-licensing jurisdictions, the candidate's score report will be printed together with any necessary instructions for license acquisition.

At the end of the testing day, the proctor runs an accounting summary report of the financial transactions for the day. At a designated time, typically during the night, the personal computer 40 will transmit the requisite information such as demographic information, responses to screening questions and answers to the examination questions back to the central computer 30 via modem 41. The central computer 30 stores the relevant information. Such information can therefore be deleted from the memory of the personal computer 40 at the assessment center. If another test is to be given at the assessment center, the central computer 30 will then download the new examination information to the personal computer 40.

Referring to FIG. 3, the operation of the circuitry of the portable user interactive device 60 will be considered in greater detail. Each portable user interactive device includes a CPU board 100 for a microprocessor or CPU 250, shown in FIG. 4A as CPU 250. The CPU board 100 is connected with a communications port 102 which functions to permit external communications. The CPU board 100 is also connected with a 12 volt rechargeable battery 108 through a ground line GND and a voltage line VBAT. To permit recharging of the battery 108, the CPU board 100 is connected with suitable external battery charging terminals. Specifically, the CPU board 100 is connected with a battery charging connector 120 which is adapted to electrically connect with mating terminals on the storage rack 62 to permit recharging of the battery 108 when the portable user interactive device is stored in the storage rack 62. The battery charging connector 120 includes a pair of external terminals. One external terminal is connected with ground line GND from the CPU board 100 and the other terminal is connected with a positive 12-volt line +12I from the CPU board 100.

Recharging of the battery 108 can also be effected outside of the storage rack 62. For this purpose, a conventional coaxial battery charging jack 122 is provided having one terminal connected with the 12-volt line +12I and the other terminal connected with the ground line GND.

An indicator is provided externally on the casing of the portable user interactive device 60 to indicate when the battery 108 is being charged. The indicator is in the form of an LED 126 connected with the CPU board 100. The LED 126 illuminates when the battery 108 is connected with a source of charging potential through the battery charging terminals of charging connector 120 or charging jack 122. When the device 60 is disconnected from the charging source, the LED 126 turns off.

The CPU board 100 is also connected with a display controller board 130 which is in turn connected with the display 134 for the device. The display controller board 130 includes a display controller 800, as shown in FIG. 5C, which cooperates with microprocessor 250 on the CPU board to control the display of information on the display 134. The display 134 is preferably a double super-twist LCD display such as Part No. LM64135Z manufactured by Sharp Electronics Corporation.

As shown in FIG. 3, the CPU board 100 is connected with the display controller board 130 by address lines A0 through A15. The CPU board 100 is also connected with the display controller board 130 by eight data lines D0 through D7. Additionally, the CPU board 100 is connected with the display controller board 130 by a pair of ground lines GND and a five-volt line +5V. Line VEE which connects the CPU board 100 with the display controller board 130 is used as a voltage supply line to permit intensity adjustment of information displayed on the display 134. The READY line is used to provide a ready indication from the display controller 800 on the display controller board to the microprocessor 250 on the CPU board 100. The reset line RST from the CPU board 100 to the display controller board 130 is used to reset the display controller 800 when the device is turned on.

The CPU board 100 is also connected to the display board 130 by an input/output read line $\overline{\text{IORD}}$, an input/output write line $\overline{\text{IOWR}}$, a memory read line $\overline{\text{MRD}}$, and a memory write line MRW. The $\overline{\text{IOWR}}$ line permits the microprocessor 250 to instruct the display controller 800 to write information to the display 134. The $\overline{\text{IORD}}$ line permits the microprocessor 250 to instruct the display controller 800 to read information from the display 134. The memory write line $\overline{\text{MRW}}$ permits the microprocessor 250 to write information to the display controller memory in the form of RAM 810 for the display controller 800. The memory read line $\overline{\text{MRD}}$ permits the microprocessor 250 to read information from the display controller memory.

Considering the connections between the display controller board 130 and the display 134, a five-volt line +5V, a ground line GND and a voltage adjust line VADJ are provided. The voltage adjust line VADJ serves to provide a voltage to the display 134 to provide intensity adjustment for the information on the display. The display controller board 130 is also connected with the display 134 by eight data lines LD0–LD7. Data lines LD0–LD3 contain the information for one-half of the display while data lines LD4–LD7 contain the information for the other half of the display. The display controller board 130 is also connected with the display 134 by control lines FRM, LC, and SCK which serve to control the display of information on the display 134. Frame control line FRM controls the timing of information by screen. Latch clock line LC controls the display of information by line. The shift clock line SCK controls the display of information by bytes.

The display 134 also includes a back light 136 provided by a pair of fluorescent lights for back lighting for the display. To provide the required AC power for the fluorescent lights, the CPU board 100 is connected with the backlight 136 by AC voltage lines VAC1 and VAC2.

The CPU board 100 is connected with the RAM card 104 by the address lines A0 through A15 which are also connected with the display controller board 130. An additional address line A16 also connects the CPU board 100 with the RAM card 104. The eight data lines D0 through D7, which are connected between the CPU board 100 and the display controller board 130, are also supplied to the RAM card 104. The CPU board 100 also supplies a 5-volt line +5V and a ground line GND to the RAM card 104.

A write line $\overline{WE}$ and a read line $\overline{RD}$ connect the CPU board 100 with the RAM card 104 to enable the CPU 250 to write and read information from the RAM card 104. A card enable line $\overline{CARD}$ connects the CPU board 100 with the RAM card to enable information to be written to or read from the RAM card 104. A power enable line $\overline{POWER}$ also connects the RAM card 104 with the CPU board 100. The $\overline{POWER}$ line serves to connect the circuitry of the CPU board 100 with the battery 108 when the RAM card 104 is inserted into the portable user interactive device 60. As such, the $\overline{POWER}$ enable line provides a switch signal for turning the device 60 on and off in response to the insertion and removal of the RAM card 104 from the device 60.

In order to permit information to be input to the device by the user, the device 60 includes a touch screen 140 which is connected with the CPU board 100 through a touch screen controller board 145. The touch screen 140 is of the type marketed by Elographics, Inc. under Part No. 2763-693. The touch screen controller board 145 is also marketed by Elographics, Inc. under Part No. E271-280. As shown in FIG. 3, lines X+, X−, Y+ and Y− connect the touch screen 140 with the touch screen controller board 145 to provide the X and Y coordinates of a user's touch on the touch screen 140. The touch screen controller board 145 is also connected to the CPU board 100 by a ground line GND and a 5-volt line +5V. Lines TX and RX also connect the touch screen controller board 145 with the CPU board 100 to respectively permit information to be transmitted to the touch screen controller board 145 from the CPU board 100 and to permit information to be received from the touch screen controller board 145 by the CPU board 100.

Figure 4A:
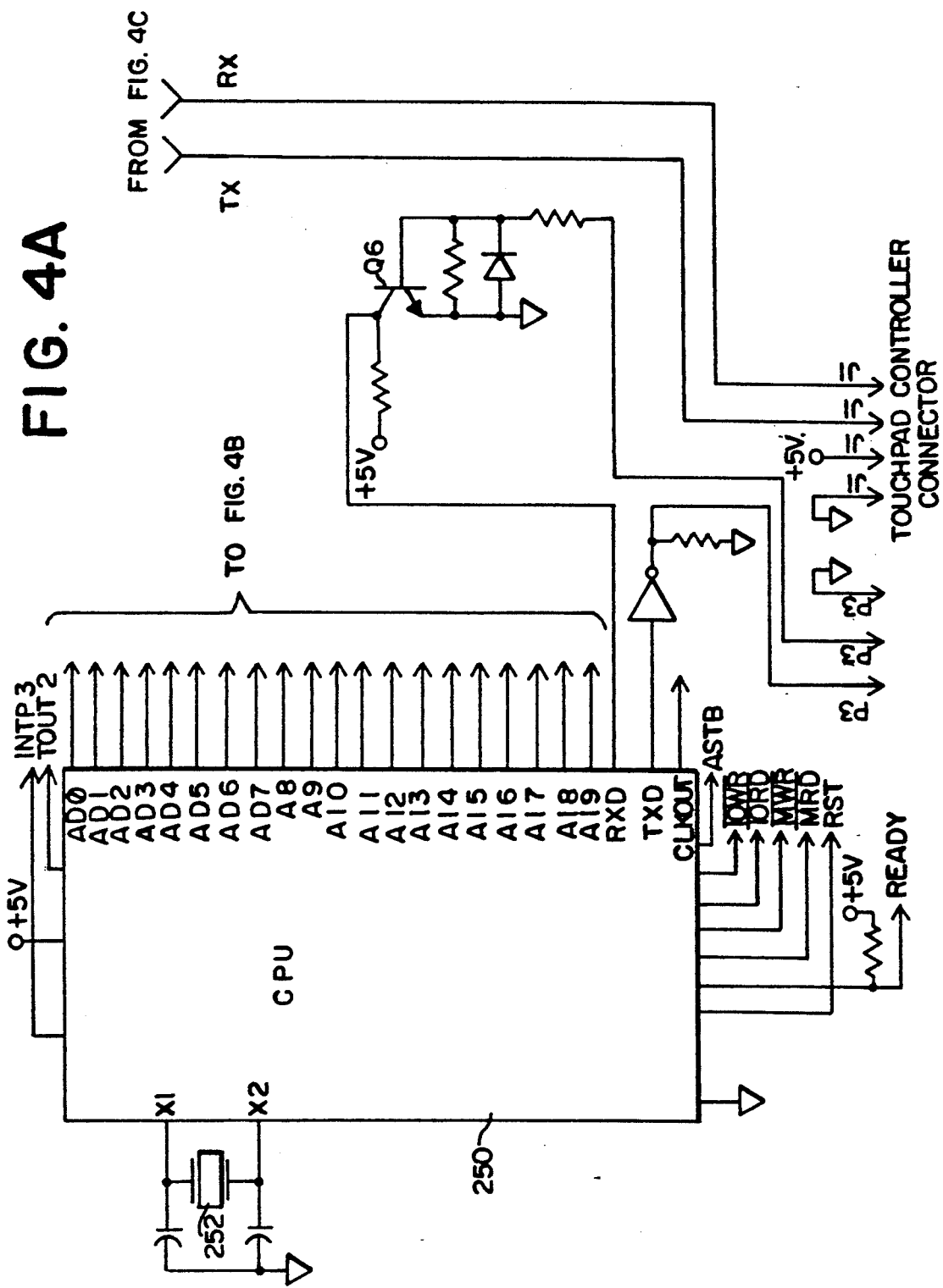

The circuitry of the CPU board 100 is depicted in FIGS. 4A through 4G. As shown in FIG. 4G, the CPU board includes a battery charging circuit having a pair of connector lines J2 which lead externally of the device to the external terminals provided by the battery charging connector 120. One of the J2 lines serves as a ground line GND. The other J2 line serves as the positive 12-volt potential line +12I for connection with the positive terminal of the battery 108. In order to provide the indication that the battery 108 is connected with a source of charging potential through the external contacts provided by the battery charging connector 120, the positive potential J2 line +12I is connected to ground through a resistor and the LED 126. Illumination of the LED 126 indicates that a charging potential is operably connected with the battery 108 to permit recharging.

The battery charging circuit also includes a pair of jack connectors P2 which lead to the external jack terminals provided by the battery charging jack 122 shown in FIG. 3. One of the jack connectors P2 is connected to ground GND together with the grounded connector line J2 of the battery charging connector 120. The other jack connector P2 is connected with the positive terminal of the battery 108 and also with the LED 126 to provide indication that the battery is operably connected with a source of charging potential by the external terminals of the charging jack 122 to permit recharging of the battery.

In order to regulate the charging of the battery 108 when the battery charging connector 120 is used, a battery charging circuit 199 is connected between the battery and the positive potential J2 connector line +12I. The battery charging circuit functions to regulate the charging of the battery to prevent the battery from becoming overcharged. This is particularly useful when the battery is being charged by the battery charging connector 120 while the device 60 is stored in the storage rack 62. The battery charging circuit includes a charge control circuit in the form of battery-charger integrated circuit chip 200 such as that marketed by Unitrode Corporation of Lexington, Mass. under Chip No. UC3906. As depicted in FIG. 4G, the battery-charger chip 200 is operably connected to provide a dual level charger which permits full charging of the battery at low levels of charge but only a trickle charge after the battery has become fully charged.

In order to supply a source of predetermined voltage potential for the operation of the circuitry for the device, the internal power source for the device includes a power supply circuit, generally designated 212, on the CPU board 100. The power supply circuit 212 is connected with the battery 108 through a transistor switch 210. The transistor switch 210 functions to operably connect and disconnect the battery with the power supply circuit 12. As shown in FIG. 4G, the transistor switch 210 includes main terminals connected between the power supply circuit 212 and the battery. The base of the transistor switch 210 is supplied with the $\overline{POWER}$ signal which is produced when the RAM card 104 is inserted into the receiving port on the device 60. Insertion of the RAM card serves to connect the base of the transistor switch 210 with ground thereby activating the transistor switch 210 into conduction and causing the battery to be connected with the power supply circuit 212.

When the transistor switch 210 is switched on, the power supply circuit 212 is enabled to produce a 12-volt supply VSUPP. In order to provide a 5-volt supply +5V, a DC to DC converter circuit 215 is connected with the 12 volt supply VSUPP. The DC to DC converter circuit 215 includes a DC to DC voltage converter chip such as that manufactured by Motorola Semiconductor Products Inc. of Phoenix, Ariz. under chip No. MC34063. The DC to DC converter circuit 215 functions to convert the 12-volt supply VSUPP to a 5-volt supply +5V.

Considering the operation of the microprocessor 250, as shown in FIG. 4A, the CPU 250 is connected with an oscillator 252 which serves as a clock. The CPU 250 is connected with a UART 260, as shown in FIG. 4C, by an interrupt line INTP3 and by a timer output line TOUT2. The interrupt line INTP3 provides an interrupt signal to the CPU 250 from the UART 260 to indicate reception of data by the UART 260 for transmission to the CPU 250. The timer output line TOUT2 provides an output timing signal to the UART 260. The CPU 260 also provides a clock output CLKOUT to the clock pin CLK of the UART 260. The clock output signal provides a synchronization clock for the UART 260.

The CPU 250 includes a reset pin RST to provide the reset signal to the display controller 800 as shown in FIG. 5C. The ready signal is supplied to the CPU 250 from the display controller 800 on ready line READY.

The CPU 250 also produces the input/output read and write signals $\overline{IORD}$ and $\overline{IOWR}$, respectively, as well as the memory read and write signals $\overline{MRD}$ and $\overline{MWR}$. An address strobe signal ASTB is also produced by the CPU 250. Lines RXD and TXD serve to connect the CPU 250 with the external communications port 102 at connector P3.

The CPU 250 also provides time-multiplexed address/data lines AD0 through AD7 and address lines A8 through A19. The eight address/data lines AD0 through AD7 are connected from the CPU 250 to a data bus 262 as shown FIG. 4B. In order to latch the address information which is put onto the data bus 262 by the CPU 250 over address/data lines AD0 through AD7, a lower address latch 265 is provided. The input of the latch 265 is connected with the data bus 262 by data lines D0 through D7. The output of the latch 265 is provided by output pins Q0 through Q7 which are connected to an address bus 266 by address lines A0 through A7. The lower address latch 265 has an enable pin E which receives the address strobe ASTB from the CPU 250 to enable the latch 265 to latch the lower 8-bits of address A0 through A7 from the data bus 262 in a time-multiplexed manner. The latched address bits A0 through A7 are then output onto the address bus 266 by the latch 265.

Address lines A8 through A15 from the CPU are directly connected with the address bus 266. Address lines A16 through A19 from the CPU are connected to an upper address latch 270. The latch 270 has a pair of enable input pins E which receive the address strobe ASTB from the CPU to enable address information to be latched from address lines A16 through A19. Address information is output by the CPU on lines A16 through A19 in a time multiplexed fashion.

Since the administration of an examination to a candidate is often timed, the portable user interactive device includes a real-time clock. The CPU board 100 includes a spare PROM socket 275 which in the present embodiment receives a real-time clock chip to provide real time. The clock chip inserted into PROM socket 275 utilizes one of the address lines and one of the data lines to provide real time information over the data line. The socket 275 is also available to receive an additional PROM chip when necessary. In the preferred arrangement, the spare PROM chip is not required.

In order to store selected operational programs for the system, such as a self-testing program, a read-only memory in the form of a PROM 280 is provided on the CPU board 100 for the microprocessor. The PROM 280 is connected to the address bus 266 by address lines A0–A16 and is also connected with the data bus 262 by data lines D0–D7. The PROM 280 is also connected with the 5-volt source +5V. The PROM has an output enable pin $\overline{OE}$ which receives the memory read signal $\overline{MRD}$ from the CPU. This causes information to be read from the PROM when the PROM receives a chip enable signal at chip enable pin $\overline{CE}$.

The CPU board also includes a pair of RAM chips 290 and 291 to provide random access memory for the microprocessor. Each of the RAM chips includes address pins A0 through A16 which are connected with the address bus 266. Similarly, each RAM chip includes data pins D0 through D7 which are connected with the data bus 262. Each RAM chip also has an output enable pin $\overline{OE}$ which receives the memory read signal $\overline{MRD}$ to cause information to be read from the respective RAM when an enable signal is received at a chip select pin $\overline{CS}$. Each of the RAMS 290 and 291 is also connected with address line A17 from latch 270.

In order for the microprocessor 250 to enable a selected memory, the CPU board 100 includes memory decoder circuitry having a memory decoder 300 as shown in FIG. 4D. The memory decoder 300 is connected to address lines A18 and A19 from the latch 270.

The memory decoder 300 functions to decode address information from address lines A18 and A19 to output a selected memory selection signal. In response to the address on lines A18 and A19, the memory decoder can output a RAM selection signal to enable the RAM memory of the microprocessor, a CARD selection signal to enable the RAM card, a DISPLAY memory selection signal to enable the display controller RAM via the display controller, or a ROM selection signal to enable the microprocessor PROM.

Figure 4B:
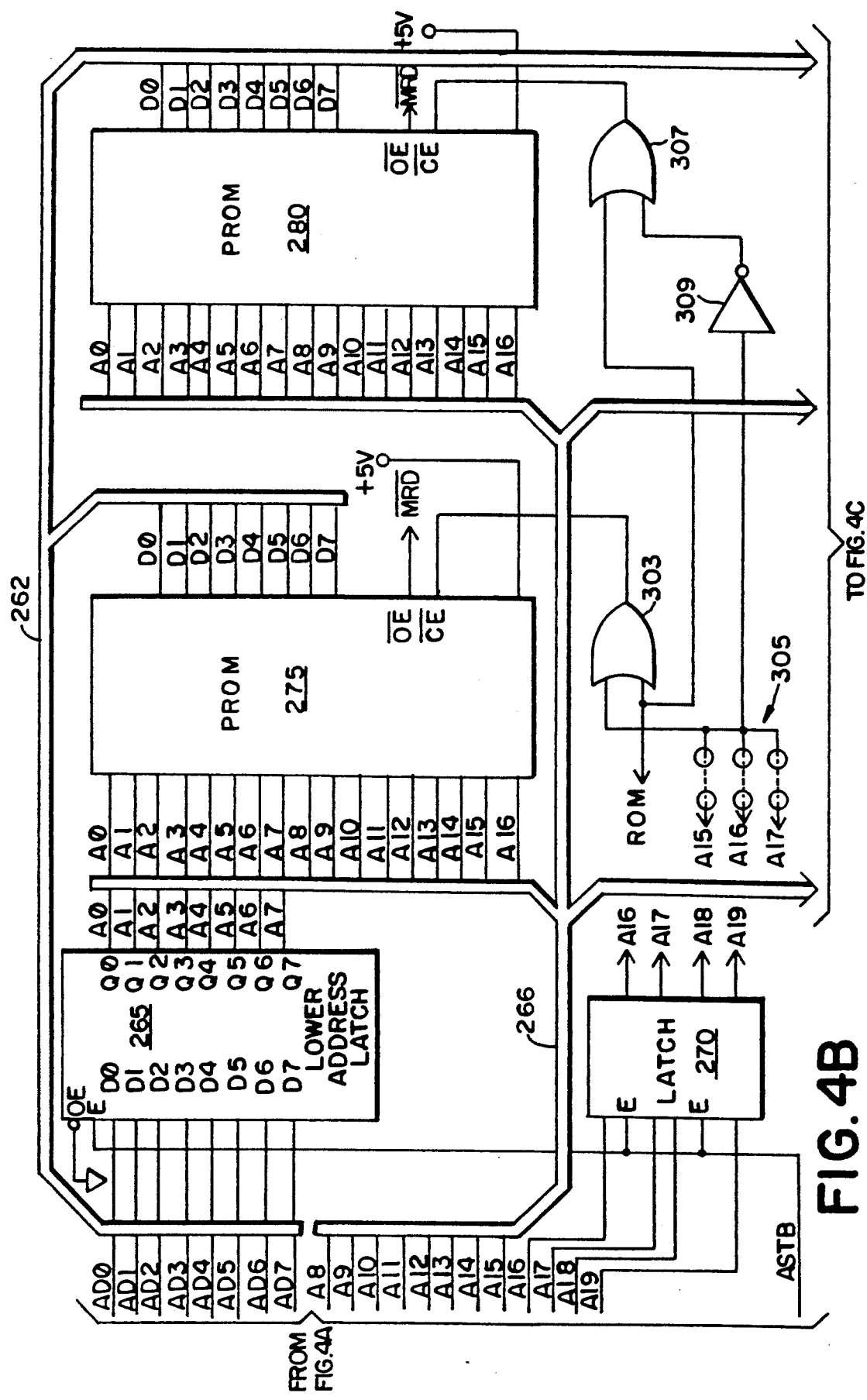
Figure 4C:
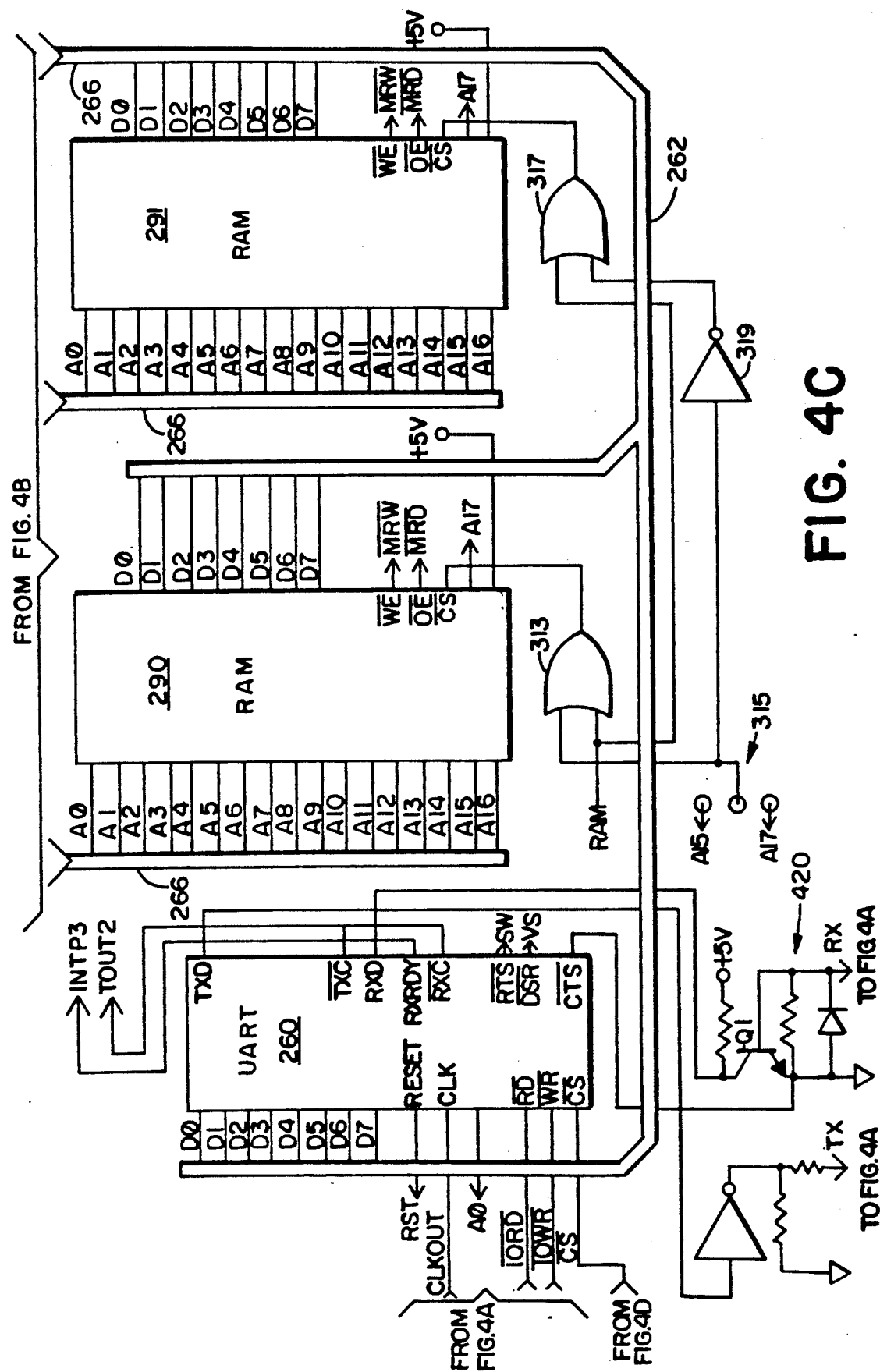

Referring to FIG. 4B, the ROM selection signal is supplied as an input to a gate 303 which also receives as an input an address signal from a jumper select circuit 305. The jumper circuit 305 can be hard wired to connect as an input to the gate 303 a selected one of address lines A15, A16 or A17 from the latch 270. Likewise, the ROM selection signal is supplied as an input to gate 307 which also receives an input from the selected one of the address lines A15, A16 or A17 from jumper circuit 305 through inverter 309. The output of gate 307 is supplied to the chip enable pin $\overline{CE}$ of PROM 280. The inverter 309 cooperates with gates 303 and 307 to determine which of the PROMS 275 and 280 is to be enabled.

The memory decoder 300 supplies the RAM selection signal as an input to gates 313 and 317 as shown in FIG. 4C. A jumper circuit 315 can be hard wired to supply either address line A15 or A17 from the latch 270 as an input to the gates 313 and 317. The output from gate 313 is supplied as an input to the chip select pin $\overline{CS}$ of RAM 290 while the output of gate 317 is supplied as an input to the chip select pin $\overline{CS}$ of RAM 291. An inverter 319 is connected between the jumper circuit 315 and gate 317 to cooperate with gates 313 and 317 to select which of the RAMS 290 and 291 is to be enabled by the RAM selection signal.

The CARD selection signal from the memory decoder is supplied as an input signal to a gate array 330 as shown in FIG. 4E. The gate array also receives the memory read signal $\overline{MRD}$ and the memory write signal $\overline{MWR}$ from the CPU 250. The gate array selectively outputs read signal $\overline{RD}$ and write signal $\overline{WE}$ to the RAM card connector for supply to the RAM card.

The RAM card connector serves as the port for removably receiving the RAM card 55. When the RAM card is inserted into the device 60, the CARD selection signal enables the RAM card memory to be accessed by the CPU 250. The RAM card connector, as shown in FIG. 4E, also provides the $\overline{POWER}$ signal generated by the insertion of the RAM card into the device to the transistor switch 210 to thereby connect the battery BAT with the power supply circuit as shown in FIG. 4G. The 5-volt source supplies voltage to terminal 31 of the RAM card connector. Terminal 16 of the RAM card connector is connected with ground. Address lines A0–A16 from address bus 266 are connected to respective terminals of the RAM card connector. Likewise, data lines D0–D7 are connected from the data bus 262 to respective terminals.

Figure 4I:
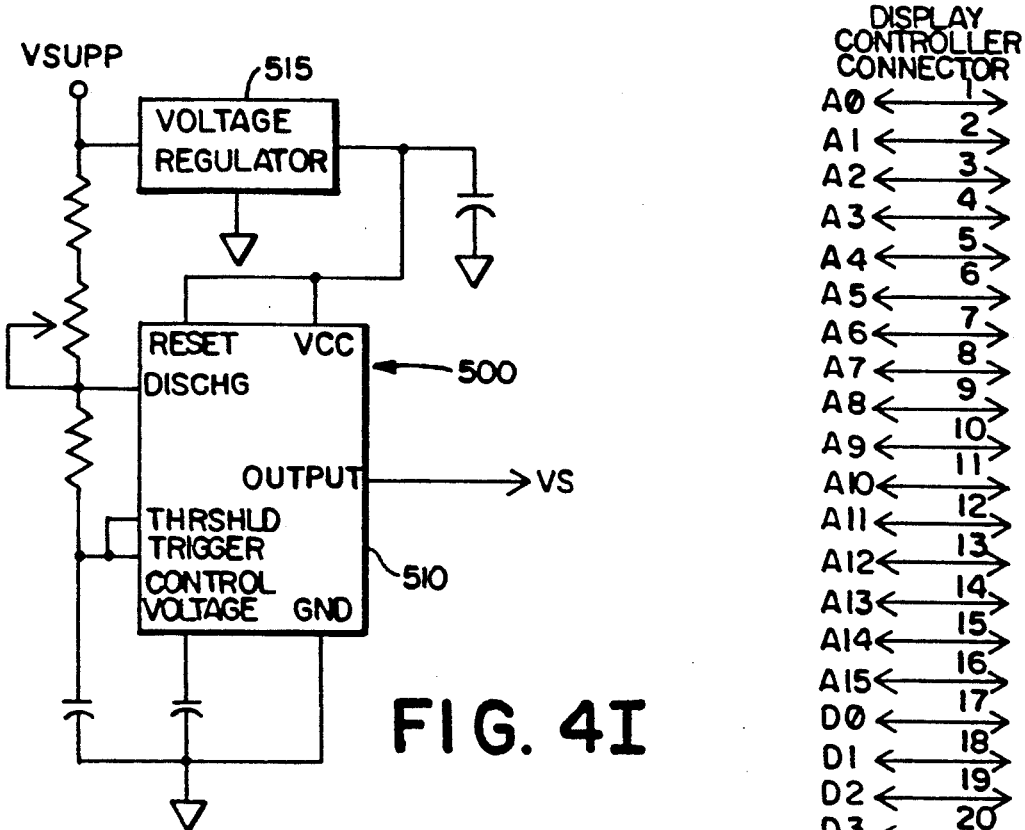
Figure 4F:
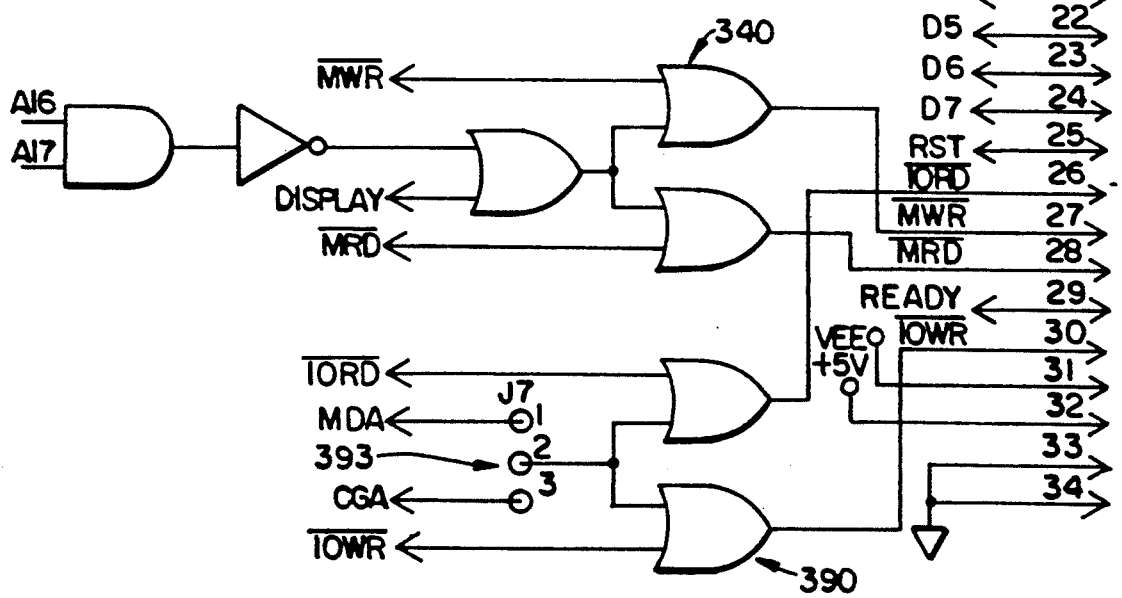

The DISPLAY selection signal from the memory decoder 300 is supplied as one of the inputs to gate array 340 as shown in FIG. 4F. The gate array 340 also receives the memory write signal $\overline{MWR}$ and the memory read signal $\overline{MRD}$ from the CPU 250. In addition, the gate array 340 receives address information on address lines A16 and A17 from the latch 270. The gate array 340 selectively outputs the memory write signal $\overline{MWR}$ and the memory read signal MRD to the display controller memory via the display controller 800 which is connected to the gate array 340 by the display controller connector shown in FIG. 4F.

The CPU 250 also receives the READY input from the display controller 800 and supplies the reset output RST from the display controller via the display controller connector shown in FIG. 4F. The display controller connector also includes terminals for connection with address lines A0-A15 from address bus 266 and for connection with data lines D0-D7 from data bus 262. Terminals of the display controller connector are also connected to ground and with the 5-volt source. The I/O write signals $\overline{IORD}$ and $\overline{IOWR}$ and the intensity adjustment voltage signal VEE are also supplied to the display controller connector.

The CPU 250 functions to control the input and output of information by an I/O decoder 368. As shown in FIG. 4D, the system includes an I/O decoder having an I/O decoder circuit 370 which in part functions to decode address information to selectively output either a monochrome display adapter signal MDA or a color graphics adapter signal CGA. The I/O decoder circuit 370 receives input over address lines A6 and A7 from the address bus 266 via the lower address latch 265. The I/O decoder circuit 370 also is connected with address lines A8 and A9 from the address bus 266. The MDA signal and CGA signal are supplied as inputs to a gate array 390 as shown in FIG. 4F. The MDA and CGA signals are supplied as inputs to a jumper circuit 393. The output of the jumper circuit 393 is connected as an input to the gate array 390. The gate array 390 also receives the I/O read signal $\overline{IORD}$ and the I/O write signal $\overline{IOWR}$ from the CPU 250. The I/O read signal $\overline{IORD}$ is output from the gate array 390 to terminal 26 of the display controller connector while the I/O write signal $\overline{IOWR}$ is supplied as an output from the gate array 390 to terminal 30 of the display controller connector. The gate array 390 functions to output the appropriate I/O read and I/O write signals in response to the input of either the MDA or the CGA signal corresponding to the hard-wired position of the jumper circuit 393. As such, the I/O decoder is generally interconnected between the CPU and the display controller to decode address information from the CPU to enable information to be input and output relative to the display 134.

As shown in FIG. 4D, the I/O decoder 368 also includes an inverter 403 and a gate 400 which cooperate with the I/O decoder circuit 370 to decode address information to selectively enable the UART 260. The I/O decoder circuit 370 supplies an output to gate 400. Address line A3 from the address bus is also connected as an input to gate 400 through inverter 403. Gate 400 outputs a chip select signal $\overline{CS}$ to UART 260 as shown in FIGS. 4C and 4D.

UART 260 includes data lines D0 through D7 connected with the data bus 262 and an address line A0 connected with the address bus 266. The UART also includes lines TXD and RXD which are connected through a buffering circuit 420 to supply respective lines TX and RX to the touch pad controller board 145 through the touch pad controller connector J1 depicted on FIG. 4A. The other two terminals of the touch pad controller connector are connected to the 5-volt source +5V and to ground. The TXD and RXD lines from the UART 260 function to transmit and receive touch data information from the touch screen controller on the touch screen controller board.

The clock output signal TOUT2 from the CPU 250 is supplied as an input to the UART 260 at a transmit clock pin $\overline{TXC}$ and a receive clock pin RXC. The interrupt signal INTP3 from the UART 260 to the CPU 250 is output from the receive ready pin RXRDY of the UART 260. The UART 260 also receives the I/O read signal $\overline{IORD}$ and the I/O write signal $\overline{IOWR}$ from the CPU at pins $\overline{RD}$ and $\overline{WR}$. The I/O read and I/O write lines $\overline{IORD}$ and $\overline{IOWR}$ respectively enable information to be read from and written to the UART from the CPU. The CPU 250 also supplies a clock out signal CLKOUT to the clock pin CLK of the UART 260. The clock out signal CLKOUT provides a synchronization clock to the UART. The UART 260 also receives a voltage sensing signal VS at input pin $\overline{DSR}$. The voltage sensing signal VS is supplied to the UART by a voltage sensing circuit 500 depicted in FIG. 4I.

Referring to FIG. 4I, the voltage sensing circuit 500 functions to sense the level of battery charge on the battery. The voltage sensing circuit includes a '555' timer 510 configured as a voltage-to-frequency converter. The '555' timer 510 receives a voltage level input from the VSUPP terminal of the power supply circuit. The VSUPP terminal derives its voltage level from the battery when switching transistor 210 is turned on. The '555' timer 510 outputs a signal VS having a frequency that is dependent on the voltage level input. The frequency of the output signal thereby represents the level of charge on the battery. The voltage sensing signal VS is supplied as an input to the UART 260 so that the voltage of the battery can be monitored by the CPU. The CPU enables the UART 260 to transmit the output signal VS to the CPU. The CPU enables the display controller to display an indicia of the level of charge on the battery on the display. With reference to FIG. I, the '555' timer 510 is connected to the voltage supply terminal VSUPP through a voltage regulator 515 which functions to maintain a steady voltage as a reference level.

The UART 260 also outputs a switch signal SW from pin $\overline{RTS}$ to a lighting supply circuit for the back light 136 and the display 134. As shown in FIG. 4H, the switch signal SW from the UART is supplied to the lighting supply circuit which serves as a back light and display intensity control circuit. Such circuitry includes a voltage converter/inverter chip 625 which performs a dual function as a DC to AC voltage inverter circuit and a DC to DC voltage converter circuit.

The lighting supply circuit also includes a voltage regulator circuit, generally designated 609, for the inverter/converter circuit 625. The voltage regulator circuit 609 is responsive to the switch signal SW from the UART 260. As shown in FIG. 4H, the switch signal SW serves to actuate transistor 610. A variable resistor 630 permits manual adjustment of the voltage regulator circuit 609. The converter/inverter circuit 625 functions to convert the positive DC voltage potential supplied at the VSUPP terminal of the power supply circuit to a suitable AC output voltage at pins ACVOUT 1 and ACVOUT 2. The AC output voltage is supplied on lines VAC1 and VAC2 to the fluorescent back lights 136. The inverter/converter circuitry 625 also functions to invert the positive DC voltage potential supplied at the VSUPP terminal of the power supply circuit to a negative DC output voltage VEE which is used in controlling the intensity of the information displayed on the display. The negative DC voltage signal VEE is supplied to the display controller board through the display controller connector as shown in FIG. 4F.

Figure 5A:
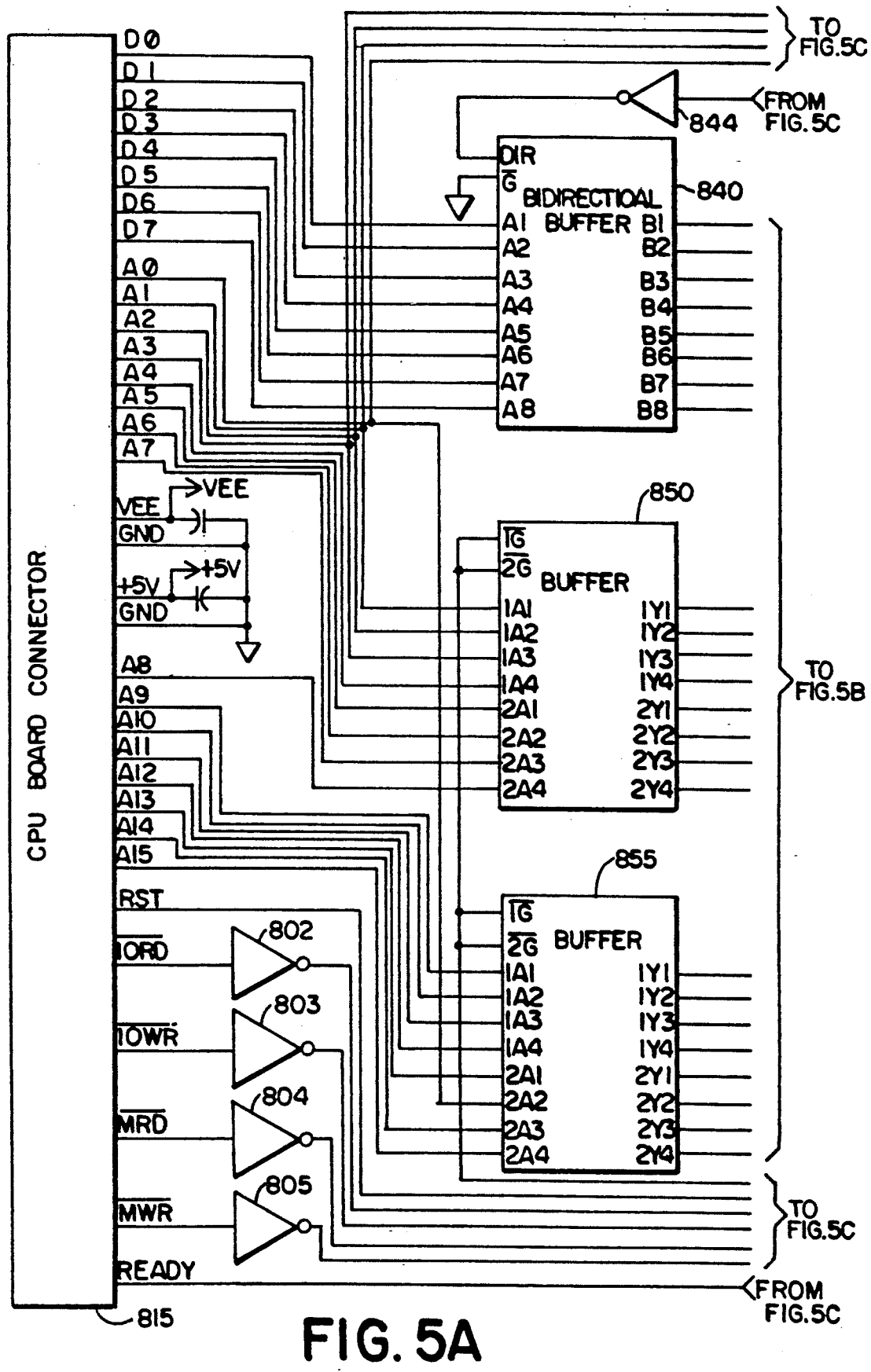
FIGS. 5A through 5C are schematic representations of the circuitry of a display controller board for the display controller used in the portable user interactive device.
Figure 5B:
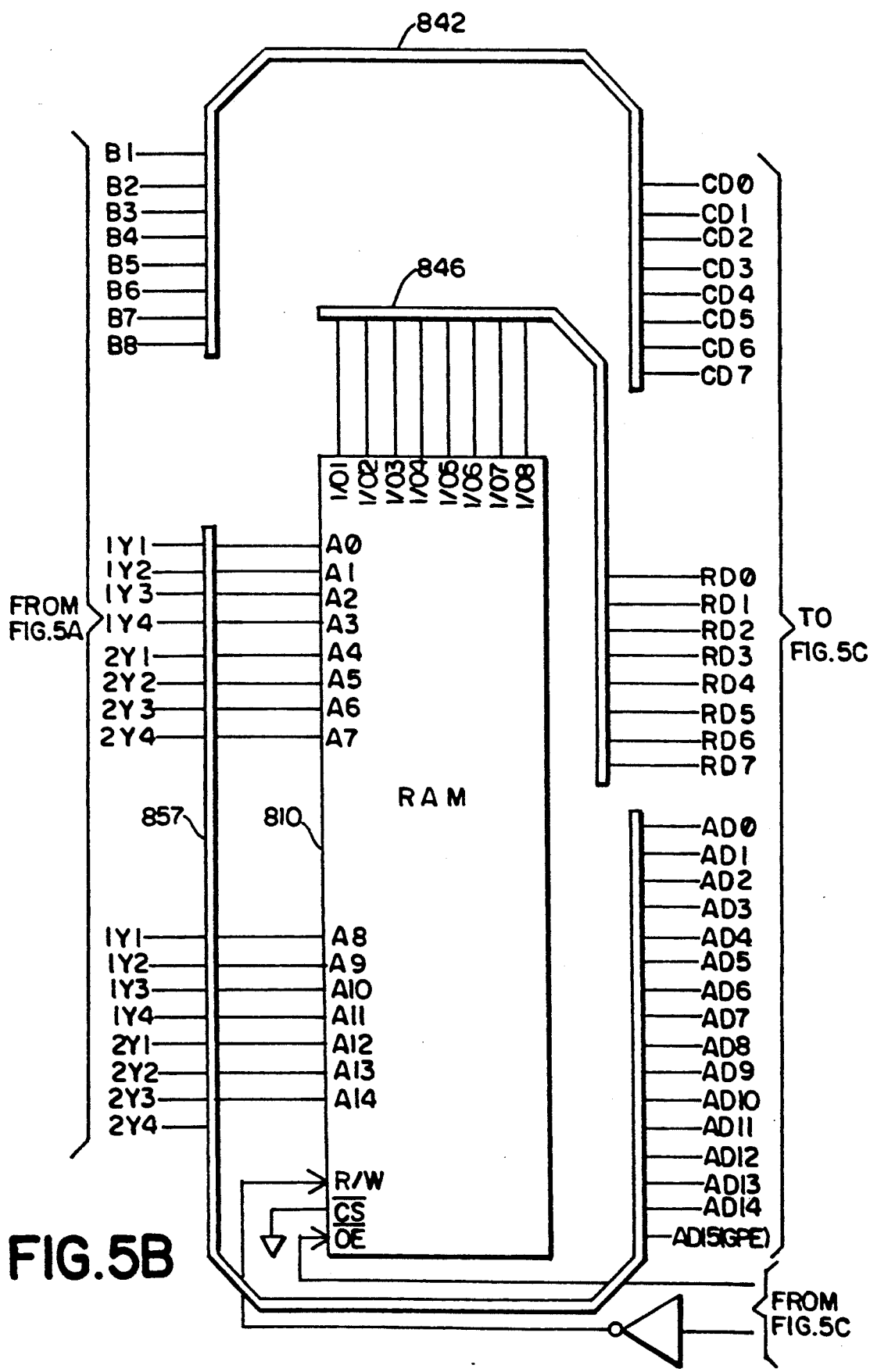
Figure 5C:
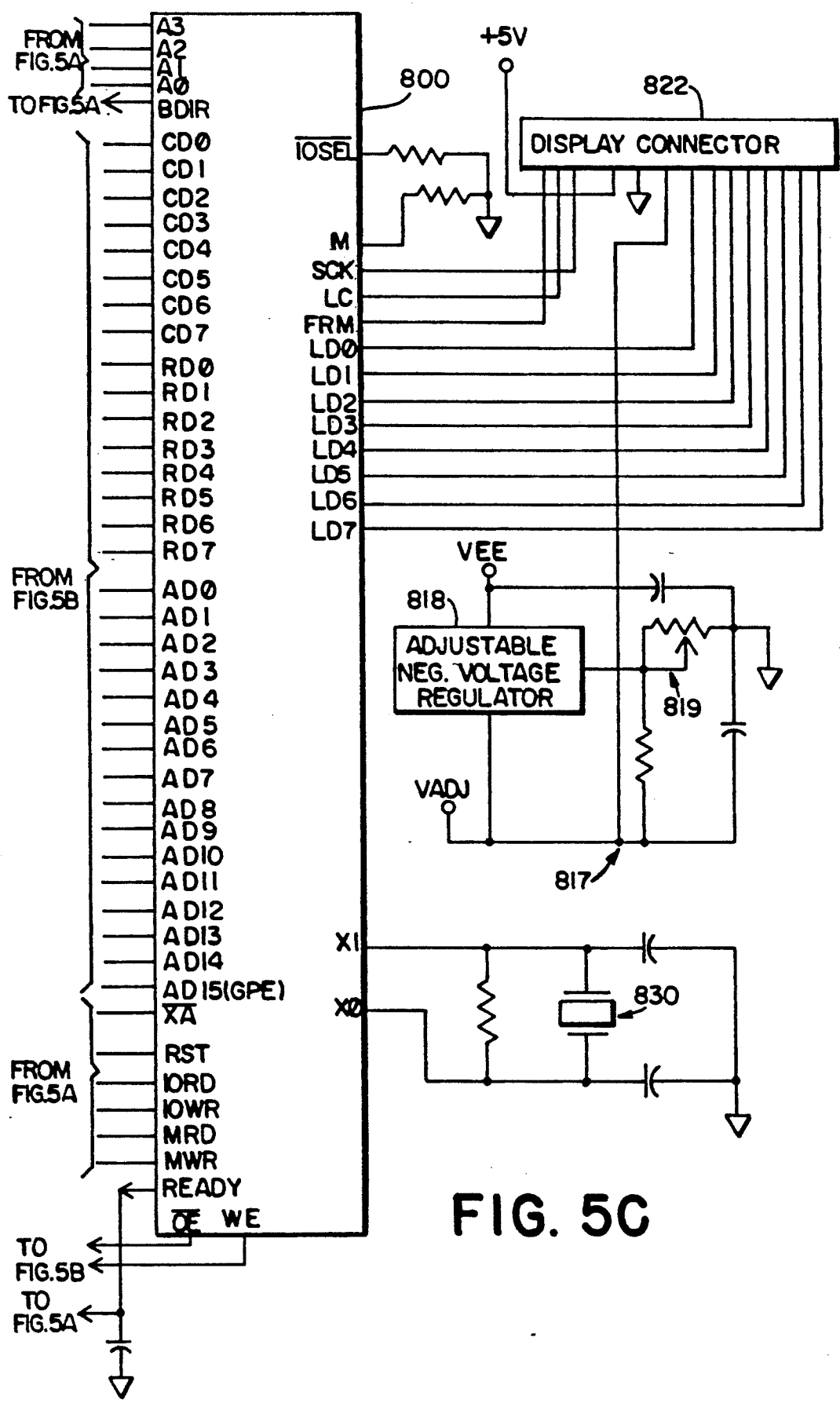

The circuitry for the display controller board 130 is depicted in FIGS. 5A-5C. As shown in FIGS. 5A and 5C, the I/O read and I/O write signals $\overline{IORD}$ and $\overline{IOWR}$ from the CPU board are supplied to the display controller 800 through inverters 802 and 803. Similarly, the memory read and memory write signals $\overline{MRD}$ and $\overline{MWR}$ from the CPU board are supplied to the display controller 800 through inverters 804 and 805. The reset signal RST is supplied to the display controller 800 by the CPU 250 to reset the display controller when the system is initially turned on. The READY signal from the display controller 800 is supplied to the CPU 250 by the display controller 800 through the CPU board connector 815. A 5-volt line and a pair of ground lines are also connected from the CPU board to the display controller board.

The intensity adjustment voltage VEE from the positive to negative inverter of the inverter/converter circuit 625 is also supplied from the CPU board to the display controller board for use with an intensity adjustment circuit, generally designated 817, on the display controller board. As shown in FIG. 5C, voltage VEE is supplied as an input to an adjustable negative voltage regulator 818 which is connected with and responsive to a manually adjustable variable resistor in the form of a thumb-wheel pot 819. The thumb-wheel pot 819 enables the user to manually adjust the input voltage VEE to an output voltage level of VADJ. The output voltage signal VADJ is supplied to the display through display connector 812 in order to control the intensity of displayed information.

A crystal 830 is connected with the display controller 800 to serve as the clock for the display controller. As shown in FIG. 5A, data lines D0 through D7 from the CPU board are connected with a bi-directional buffer 840 at pins A1 through A8. Pins B1 through B8 of the bi-directional buffer are connected with a data bus 842, as shown in FIG. 5B. The data bus 842 is also connected with pins CD0 through CD7 of the display controller 800, as shown in FIG. 5C, to permit data information to be transferred between the display controller 800 and the CPU board. The directional flow of the information is controlled with a bi-directional signal line BDIR connected between the bi-directional buffer 840 and the display controller 800 through inverter 844.

The display controller 800 is also connected with the display controller memory in the form of RAM 810 through an internal data bus 846. The CPU writes information onto RAM 810 through the display controller 800 via the internal data bus 846 which interconnects the RAM 810 with the display controller 800. Information to be displayed is read from the RAM 810 by the display controller 800 and is then output to the display 134 over lines LD0 through LD7 connected with the display connector 822. The display controller 800 also outputs an output enable signal $\overline{OE}$ to the output enable pin $\overline{OE}$ of the RAM 810 to enable the RAM 810. The display controller 800 also supplies a write or read enable signal to the RAM 810 from the write enable pin WE of the display controller 800. The write enable pin WE of the display controller is connected with the read/write pin R/W of the RAM 810. The chip select pin $\overline{CS}$ of RAM is tied to ground since only one external memory is provided for the display controller 800.

The system also includes address buffers 850 and 855 which are each connected with an address bus 857 through pins 1Y1 through 2Y4. The RAM 810 is also connected with the address bus 857 through address lines A0 through A7 and A8 through A14. The buffers 850 and 855 each include enable pins $\overline{1G}$ and $\overline{2G}$ which are connected to a buffer enable pin $\overline{XA}$ of the display controller 800. The display controller 800 enables the respective buffers by an output on pin $\overline{XA}$. Address lines A1 through A8 from the CPU board are connected with buffer 850 at pins 1A1 through 2A4. Similarly, address lines A0 and A9 through A15 from the CPU board are connected with buffer 855 at pins 1A1 through 2A4 of that buffer. Address line A0 is also supplied as an input to the display controller 800. Address lines A1 through A3 from the CPU board are also supplied as inputs to the display controller 800. The display controller also supplies the frame, line, and byte clock signals FRM, LC, and SCK, respectively, to the display connector 822 for supply to the display 134 to control the output of information onto the display.

Operation of the Portable User Interactive Device

Operation of the portable user interactive device 60 is controlled by the microprocessor 250 which runs programs for start-up and various utilities stored in the programmable read only memory PROM 280. The CPU 250 also runs a command program stored on the removable RAM card 104 for controlling various functions such as the administration of an examination. While it is recognized that the portable user interactive device 60 can be used for many different functions, a preferred use is in the context of exam administration.

Among the firmware that is stored in the PROM 280 are the routines for generating graphics displays, touch screen utilities, a tutorial program, routines for generating examination screen displays, a self-test routine, a random number generator, a time keeping program, memory and screen management programs, and a program for retrieving data from the exam and candidate files stored on the removable RAM card 104. Among the information stored on the removable RAM card are the exam file which includes header information about the exam, the test questions, the screening questions, if any, a graphics file for any special graphics used in the exam, and a candidate response file which contains candidate identification information and is used to store the candidate's responses. In addition, there is a separate status file for holding information regarding the status of the portable user interactive device 60. This status file is used to store information concerning the condition of the unit battery, time in use, and other utility information which can be used for inventory and maintenance control. The RAM card also includes a directory specifying the location of each of the above discussed files so that they may be readily located by the command program.

The portable user interactive device 60 is activated when the RAM card is inserted into the card port in the portable user interactive device 60. As part of the start-up process the portable user interactive device 60 performs a self-test that checks the microprocessor, the PROM, the battery, the internal RAM, the touch screen, and the internal clock. The results of the respective tests are displayed on the screen for each element tested. If any element fails during the self-test, a message is displayed on the screen indicating that the portable user interactive device 60 should not be used.

If all elements pass the self-test, then operation of the portable user interactive device 60 is turned over to the command program on the RAM card at which time a starting screen display is presented. An example of the starting screen display is shown in FIG. 6A. The starting screen display includes a logo or other desired information and a touch area or entry pad labeled "Start". When an exam candidate is ready to begin, the candidate touches the "Start" touch area and the second screen display is presented. The second screen display as shown in FIG. 6B includes two touch areas or entry pads, one labeled "Begin Tutor" and the other labeled "Begin Exam". From this screen the candidate can begin the tutorial program by touching the "Begin Tutor" touch area. After taking the tutorial, or if the candidate does not wish to take the tutorial, he can start the examination by touching the "Begin Exam" touch area.

When the "Begin Exam" area is touched, an identification number entry screen as shown in FIG. 6C is displayed. This screen is presented for the candidate to enter his ID number, a unique sequence of numbers and/or characters. The ID number is supplied to the candidate by the test center staff when the candidate receives his portable user interactive device 60. As the candidate touches the numbers and/or characters on the keypad on the display, the numbers and/or characters appear at the top of the screen. If an invalid ID number is entered, the system automatically clears the displayed number/character sequence and waits for a new number/character sequence to be entered. The process repeats until the correct ID number is entered.

When the correct ID number has been entered by the candidate, the system proceeds to display candidate screening questions if there are any. The examination test questions are displayed if there are no screening questions. The exam section name can be displayed for a short time, e.g., five seconds, before the start of each section of the exam.

A screening question display screen is shown in FIG. 6D. The screen includes the question number, "N.", the text of the question, touch areas or entry pads for the "YES" and "NO" answers, and two function key touch areas or entry pads. To answer the question the candidate touches the "YES" or "NO" area. The field of the answer touched is then displayed in reverse video. For example, when a backlit display screen is used, the touched area becomes darkened.

The function key touch areas or pads permit the candidate to see the next question or the previous question. The candidate can advance to the next screening question by touching the "next item" touch area. Similarly, the candidate can return to the previous question by touching the "previous item" touch area.

When the candidate has been through all of the screening questions, a screening question summary screen is displayed as shown in FIG. 6E. The summary screen shows the number of questions answered, the number of questions omitted or unanswered, and the total number of questions in the screening section. The summary screen includes three function key touch areas or entry pads: "review", "review unanswered", and "start exam". By touching the "review" touch area the candidate can review all of the screening questions in order. The candidate can also review only the unanswered screening questions by touching the "review unanswered" touch area. When all of the screening questions have been answered, the candidate can proceed to the substantive part of the exam by touching the "start exam" touch area.

An exam question display screen is shown in FIG. 6F. The screen includes the question number, "N.", the text of the question, the answer options and their corresponding response touch areas or pads, and a number of function key touch areas. When the candidate selects an answer, he touches the area labeled A, B, C, or D corresponding to the answer he has chosen. The field of the answer touched is then displayed in reverse video.

The function key touch areas permit the candidate to effect certain operational functions. For example, by touching the "mark for review" touch area at the bottom of the screen display, the unit will flag the question in the candidate response file for later review. If a question is too long to fit in the area of one screen, or if it contains graphics that do not fit on a single screen, the candidate can touch the "next page" touch area to obtain the text or graphics in the continuation screen. By touching the "previous page" touch area the candidate can return to the previous screen display for the particular exam question.

The candidate can advance to the next question on the exam by touching the "next item" touch area. If desired, the candidate can also review the immediately preceding question by touching the "previous item" touch area.

After the last exam question has been answered, an exam summary screen is displayed. A preferred format for the exam summary screen display is shown in FIG. 6G. The exam summary screen provides a tabular summary of the number of questions answered, the number unanswered, and the number marked for review. The summary screen has five operational touch areas which allow the candidate to review marked items, review any unanswered items, review the entire exam, review a specific question, or end the exam. A keypad touch area is also displayed in the exam summary screen.

When the candidate touches the "review marked items" area the unit re-displays each item that was marked for review by the candidate. Once a marked exam item has been reviewed it is no longer considered as marked. If the candidate wishes to review the question subsequently he must touch the "marked for review" area again.

When the "review unanswered items" area is touched, any questions which were not answered by the candidate are displayed in their original order. Similarly, if the "review entire exam" area is touched, each of the exam questions is displayed in order starting with the first question. The candidate can review a specific question by touching the "go to item" touch area and then entering a number on the keypad touch area to indicate the number of the question desired for review.

In order to end the exam, the candidate touches the "end exam" touch area. When the "end exam" touch area is touched, the unit displays a message informing the candidate that the exam has ended and that the test unit is to be returned to the examination proctor.

The time within which the candidate must complete the exam is controlled by the timekeeping program. The timekeeping program becomes operative when the "Begin Exam" touch area in the second screen display is touched. The timekeeping program keeps track of the elapsed time in connection with the real time clock in PROM socket 275. Near the end of the allotted time for the exam, the remaining time is displayed. For example, in the preferred embodiment, such a display is presented when there are ten (10) minutes left and at two (2) minutes left in the exam period. At 10 minutes from the end of the exam, the display is preferably only momentary so as not to distract the candidate. When only 2 minutes are left in the exam, the display remains on the screen until time runs out or the exam is completed. If the timekeeping program reaches the end of the allotted time before the candidate has completed the exam, the exam is terminated and the unit displays the message that the exam has ended and that the test unit is to be returned to the examination proctor.

Figure 7A:
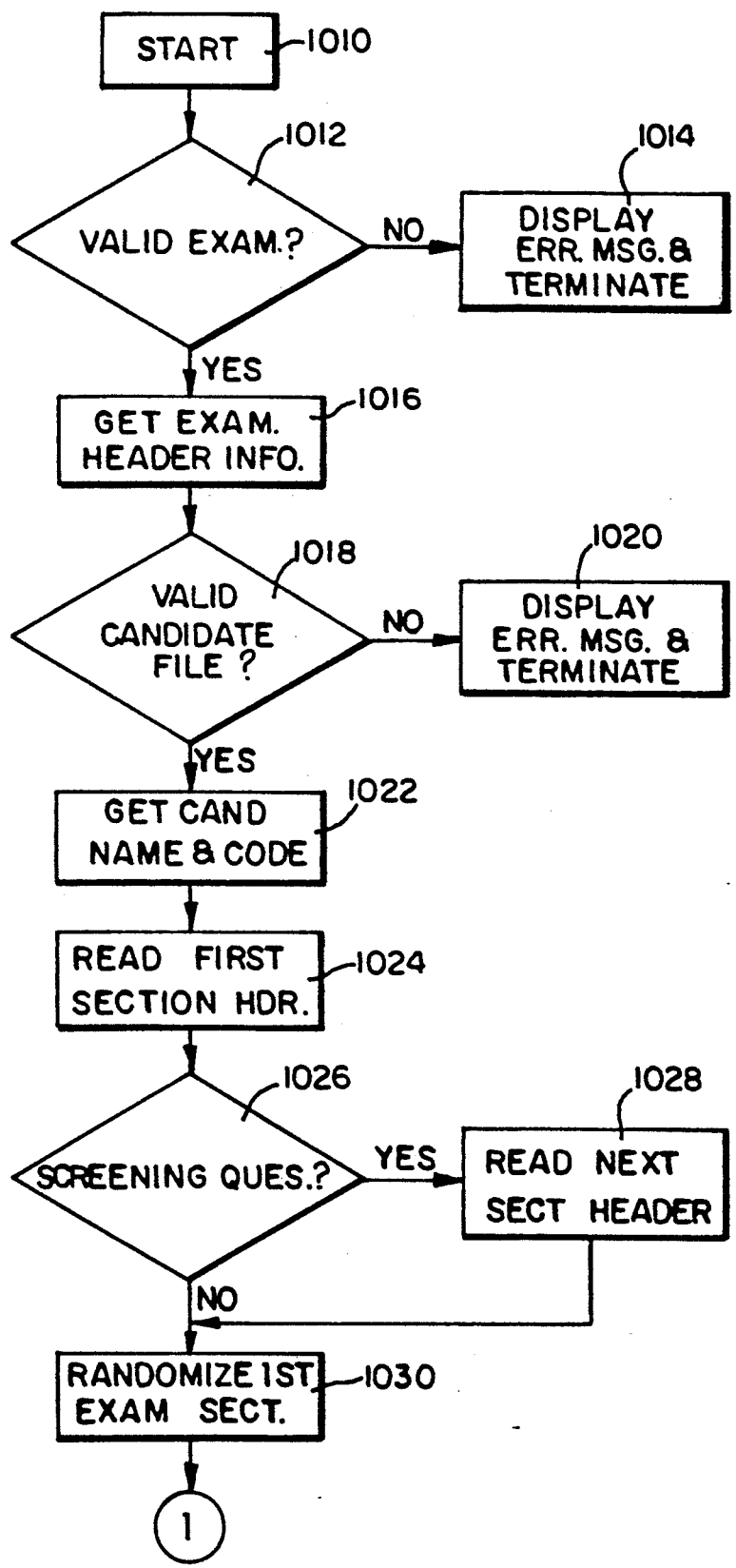
FIGS. 7A through 7H are a logic flow diagram for the command program used to run the portable user interactive device in administering an examination.
Figure 7B:
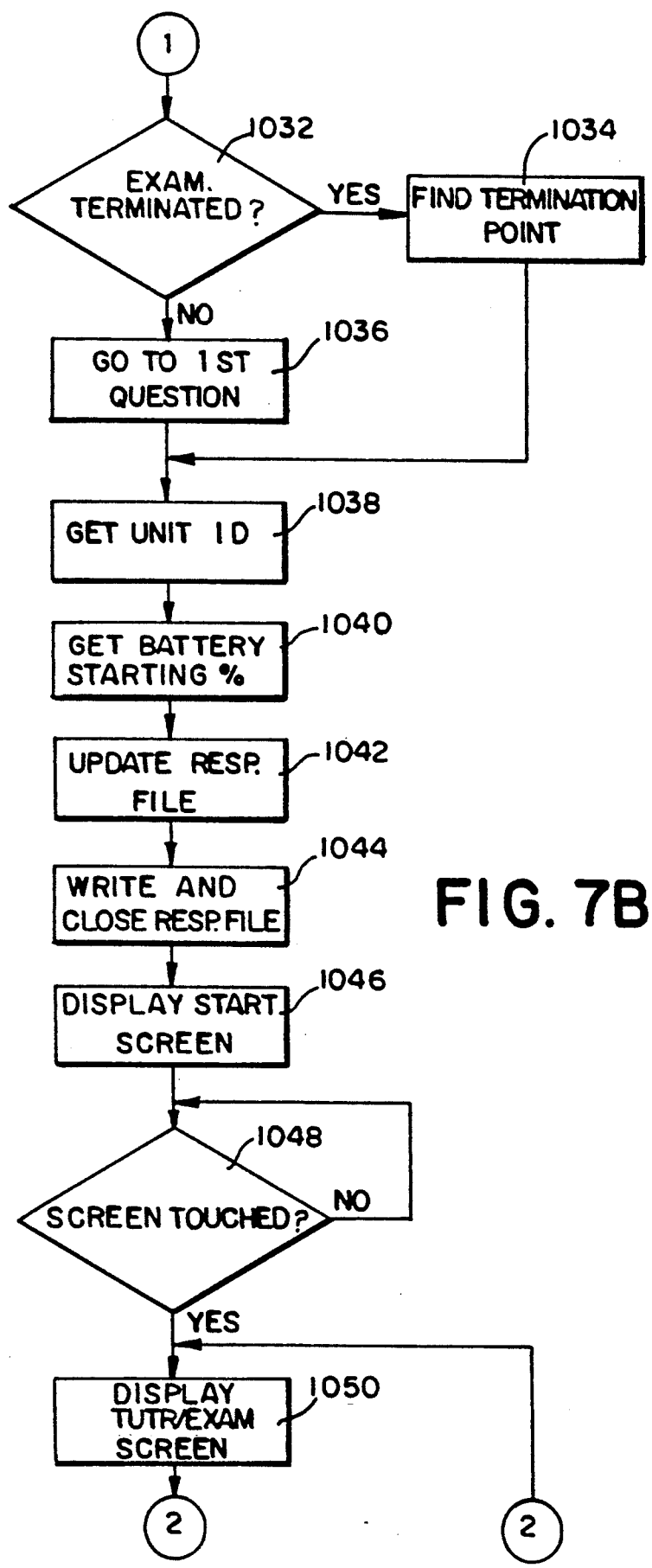
Figure 7C:
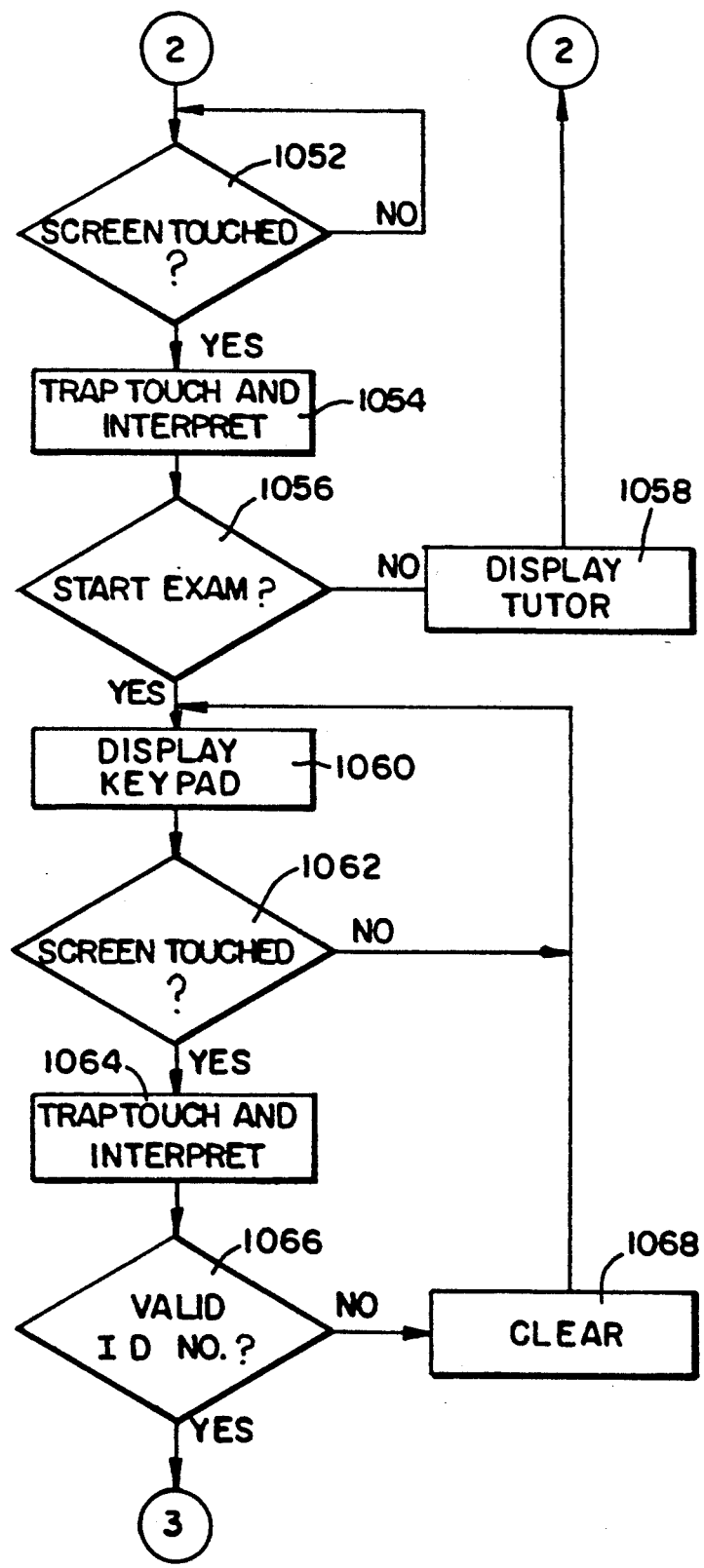
Figure 7D:
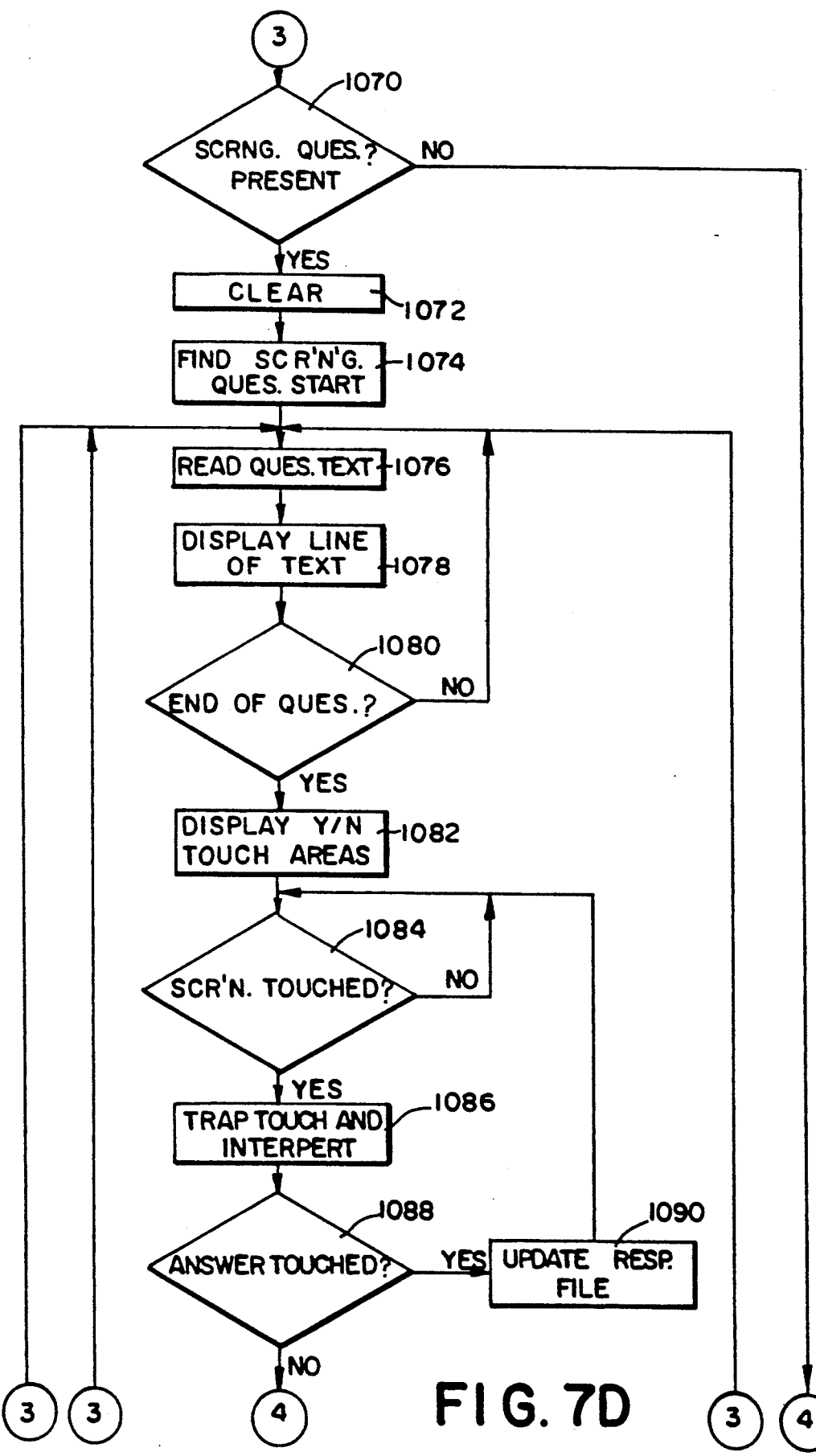
Figure 7E:
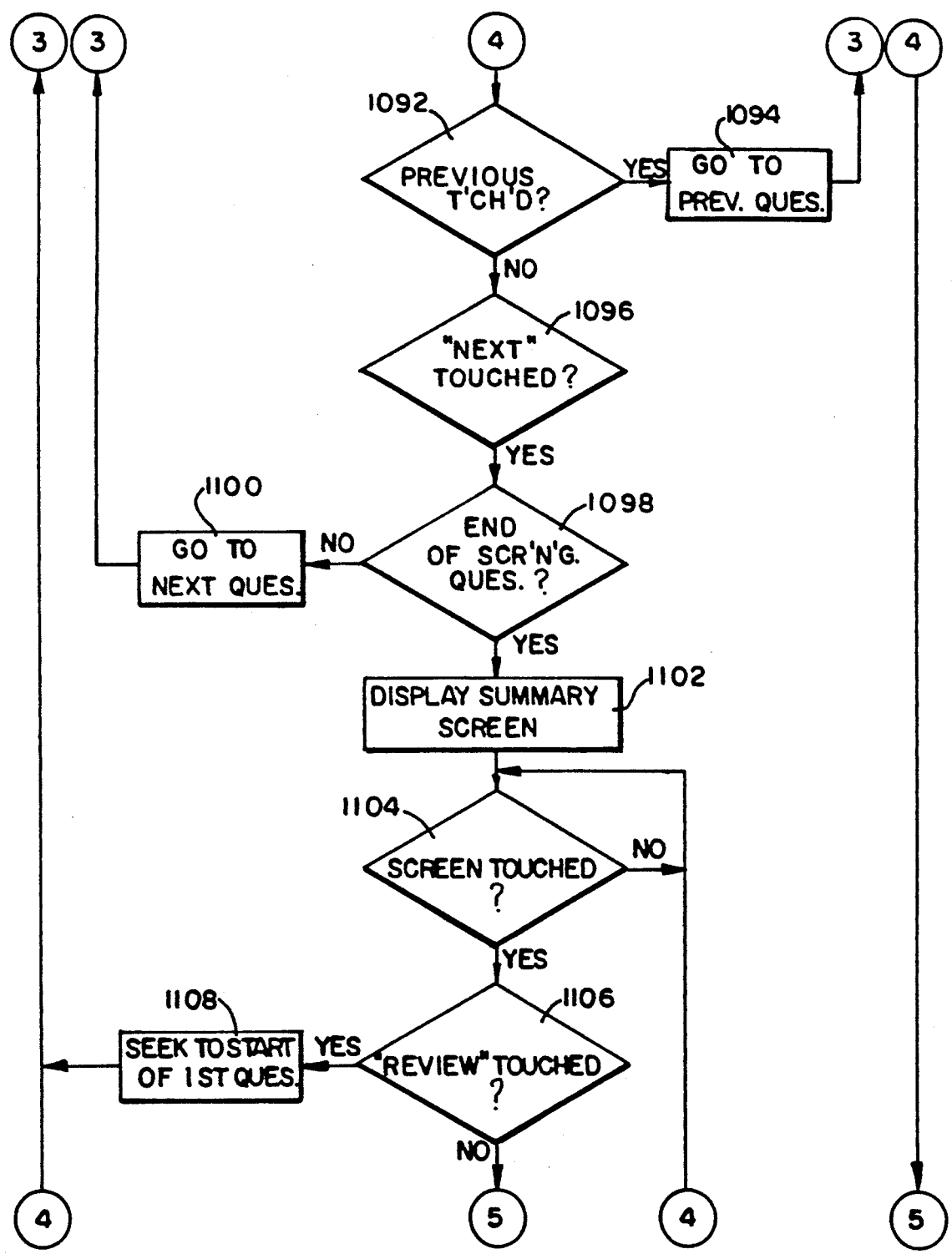
Figure 7F:
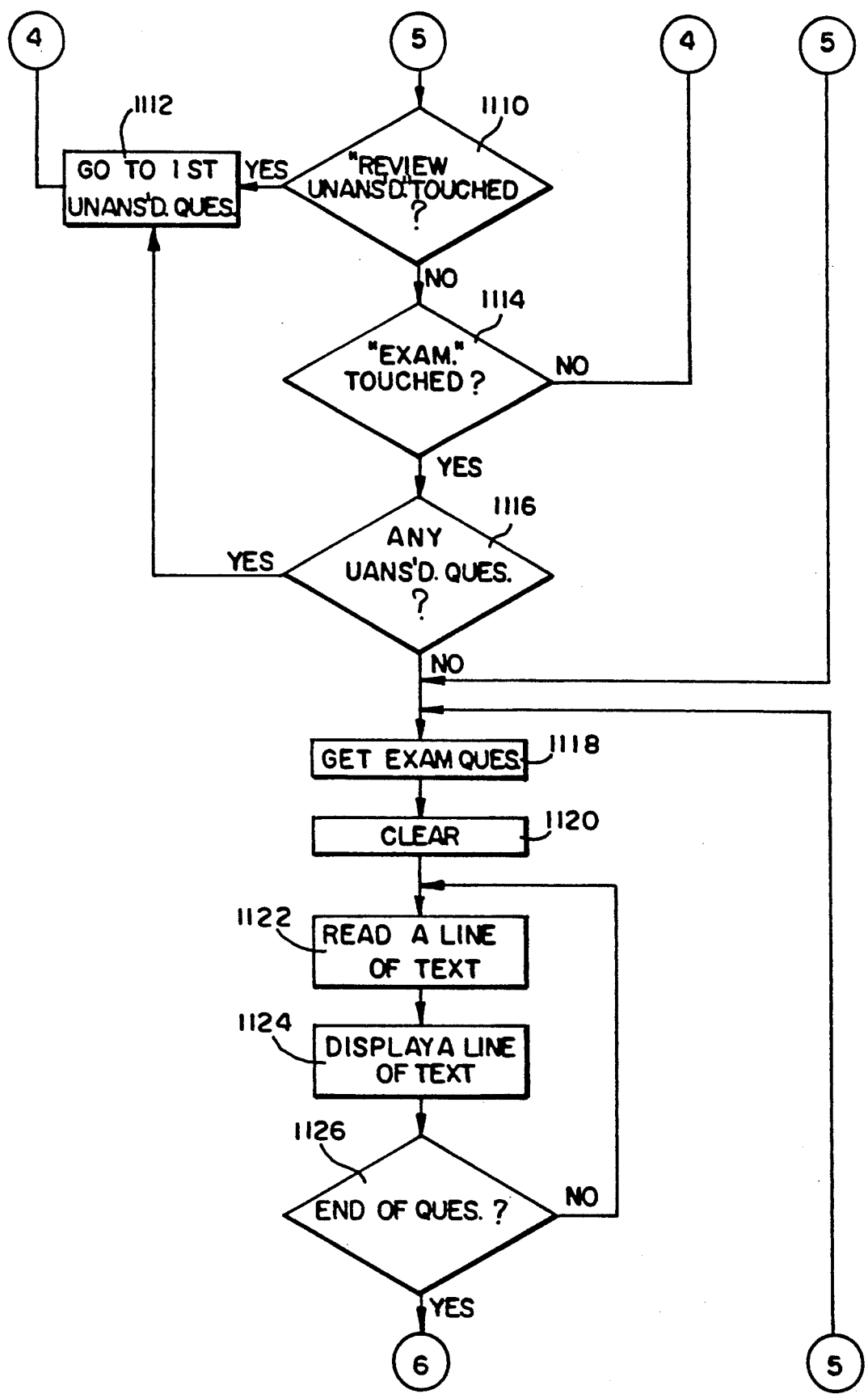
Figure 7G:
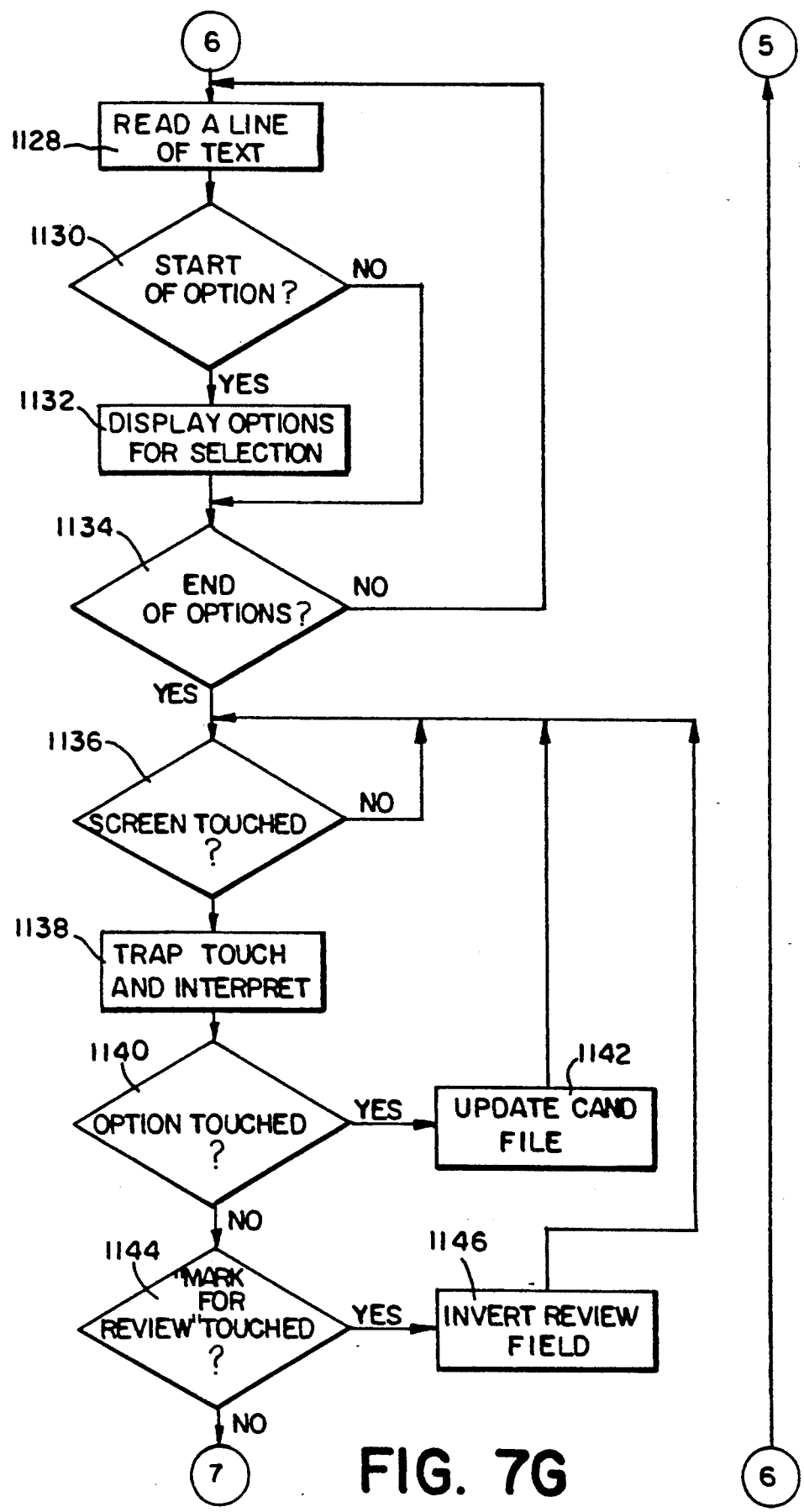
Figure 7H:
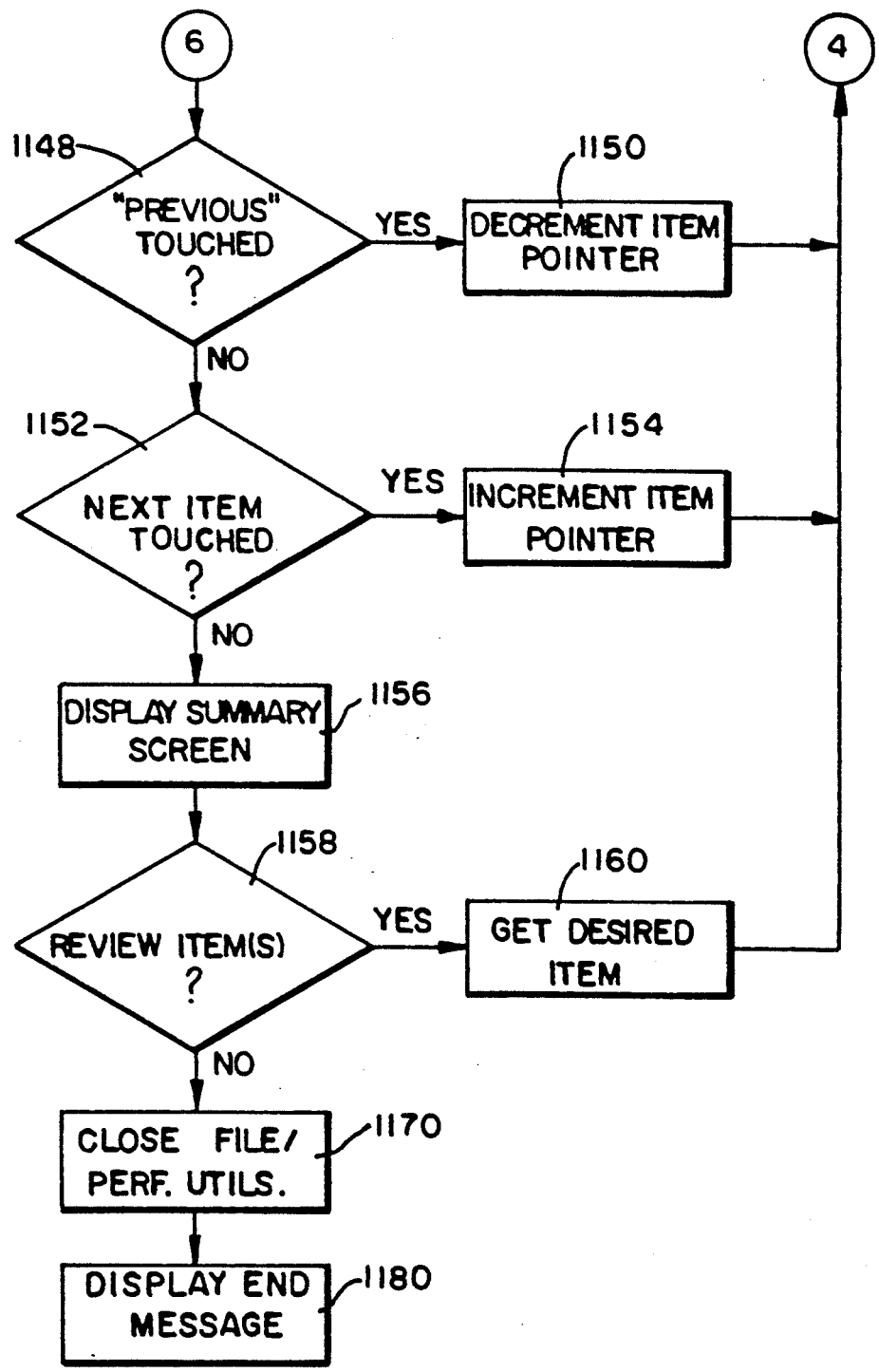

The operation of the portable user interactive device 60 is controlled by the command program stored on the RAM card. A flow chart representing the steps of the command program is presented in FIGS. 7A to 7H of the drawings. It will be recalled, that when the removable RAM card is inserted into the RAM card port, the portable user interactive device 60 is activated and a series of start-up tests are performed under control of firmware in the PROM. When the system has been booted up, and if all system elements pass the self-test, then control of the unit is turned over to the command program at starting point 1010, as shown in FIG. 7A. In step 1012 the processor checks the exam file to determine whether a valid exam file, i.e. one containing all readable data, is present on the RAM card. If an invalid exam file is present, i.e. one containing non-readable data or no exam whatsoever, the processor displays an error message and terminates operation of the unit in step 1014. If, however, a valid exam file is present on the RAM card, the processor proceeds to step 1016 in which it opens the exam file and reads all header information located therein. The header information includes such data as the number of questions in the exam, an exam identifier or name, an indicator of whether the questions in an exam section are to be randomized, the score necessary for passing an exam, and a record of the correct answers for the questions in the exam. An exam file can be subdivided into sections with each section having header information pertinent to that section.

In step 1018, the processor checks whether a valid candidate response file is stored on the RAM card. If the candidate file is invalid or none is present the unit displays an error message in step 1020 and terminates operation of the unit. If, however, a valid candidate response file is present, then the processor opens the candidate response file, reads the candidate name and the associated identification code in step 1022 and then closes the response file. In step 1024, the processor reads the first section header from the exam file, analyzes the information in the section header and determines whether the first section contains screening questions in step 1026. If the first section does not contain screening questions, then it is considered to be the first exam section, i.e., it contains substantive test questions. If, however, the first section contains screening questions the processor branches to step 1028 and reads the header of the first exam section, which is the next section it encounters. After the first substantive exam section header has been read in step 1028, or if screening questions are not present in the first section in step 1026, the processor proceeds to step 1030 to randomize the questions in the first substantive exam section.

The questions in a section of the exam are randomized using a random number generator which is started from a base or seed number. The base number of the randomizing routine is stored in a field in the candidate response file on the RAM card. Preferably, the seed number is an integer from one to ten, but can be a greater number if the number of test questions in the section is greater than 10. When the exam questions are stored in the RAM card they are in a first preselected order. The sequence of numbers generated by the randomizing program determines the order in which the test questions will be displayed to the candidate by the portable user interactive device 60. A loading table file is set up for this purpose. The memory addresses of the test questions are stored in the loading table in the same order as the sequence generated by the randomizing program. When it is time to display the exam questions, the processor reads the loading table file for the address of the question to be displayed and then accesses the text stored at that address in the exam file.

After the exam questions in a section have been randomized in step 1030, the processor checks to see if the exam was previously terminated in step 1032. For example, termination might occur if the portable user interactive device 60 loses power in the middle of an exam. To this end, the microprocessor reads a field in the response file in which is stored the random number corresponding to the last answered question before the exam was terminated. If the number in the field is other than a zero, the program was previously terminated and the processor branches to step 1034 to find the termination point, that is, the question corresponding to the last random number in the field. If the number in the field is zero then the processor proceeds to step 1036 and obtains the address of the first question in the exam file.

The processor reads the unit ID code from the PROM in step 1038 and reads the battery starting percentage in step 1040 from the microprocessor RAM. The process then updates the response file in step 1042 by writing the unit identification code and battery starting percentage to respective fields in the response file and then closes the response file in step 1044.

When the foregoing preliminary steps have been completed, the unit displays the start screen of FIG. 6A in step 1046. In step 1048 it enters a loop to wait for the "start" touch-area on the start screen to be touched. When the "start" touch-area has been touched by the candidate, the unit displays the screen for choice of exam or tutor as shown in FIG. 6B. In step 1052 the processor enters a second loop to wait for the screen to be touched and when the screen is touched the processor traps and interprets the touch in step 1054 to determine which area, "begin tutor" or "begin exam" was touched. In step 1056, if the "begin exam" touch-area was not touched, then the processor proceeds to step 1058 to display the tutorial information. When the tutorial information has been displayed, the processor loops back to step 1050 to re-display the tutor/exam selection screen and performs steps 1052, 1054, and 1056 again.

When the "begin exam" touch-area is touched in step 1056, the processor proceeds to step 1060 and displays the identification number entry keypad. In steps 1062, 1064, and 1066, the processor monitors the touch screen until a series of characters has been entered and determines whether or not the character string entered via the touch screen is a valid user identification number. The identification number entered on the touch screen is compared to the reference identification number which is down-loaded from the personal computer 40 onto the RAM card 55. If the character string is not a valid user identification number, then the processor clears the display in step 1068 and re-displays the keypad entry screen. The process is repeated until a valid user identification number is entered by the person taking the examination.

If, in step 1066, it is determined that the character string is a valid user identification number, the processor proceeds to step 1070 and checks whether screening questions are present in the exam file. If no screening questions are present, the processor jumps to step 1118 (FIG. 7F) to display the first exam question. If, however, in step 1070, it is determined that screening questions are present, then the processor clears the display screen in step 1072 and in step 1074 reads the exam file to the address of the first screening question. The processor stores the address of the first screening question encountered in a separate table. After storing the address of the first screening question, the processor, in step 1076, reads the text of the first question and loads the display memory with the text characters until a control character is encountered. The control character indicates the end of a line of text. When a full line of text has been loaded to the display memory in step 1078, it is displayed on the screen. In step 1080 the processor determines whether the end of the question text has been reached. If it has not, the processor loops back through steps 1076 and 1078 to read and display the next line of text. The processor continues reading and displaying lines of text until the end of the question text has been reached. In step 1082 the processor displays touch-areas or entry pads corresponding to "yes" and "no" answers for the displayed question. In connection with the displays of the "yes" and "no" touch-areas, two function touch-areas are also displayed on the screen as shown in FIG. 6D. One of the function touch-areas, "previous item", permits the candidate to go back to the previous question and the other function touch-area, "next item", permits the candidate to go to the next screening question.

The processor then polls the touch-screen in step 1084 to determine if it has been touched, and the processor waits until the screen has been touched. When the screen is touched, the processor traps the X-Y coordinates of the touched area and interprets it to determine which touch-area was touched. If either the "yes" or "no" touch-area was touched, the processor updates the candidate response file by writing the selected answer in step 1090 and then closes the response file. The processor then waits for the screen to be touched again in step 1084. Steps 1086, 1088, and 1090 are repeated whenever the "yes" or "no" touch area is touched by the examinee. If, in step 1088, it is determined that neither the "yes" or "no" touch-area has been touched, the processor determines whether the "previous item" touch-area was touched in step 1092, and if it was, the processor reads the address of the previous question in step 1094 and re-displays that question and the yes/no touch-areas by repeating steps 1076, 1078, 1080, and 1082. If, in step 1092, it was determined that the "previous item" touch-area was not touched, then the processor determines whether the "next item" touch-area was touched in step 1096, and if so, it determines in step 1098 whether the last screening question has been displayed. If the last screening question has not yet been displayed, the processor branches to step 1100 to read and display the next screening question. In this manner, each screening question is displayed and the answers recorded in the response file.

When the end of the screening questions is reached in step 1098 the processor displays the summary screen for the screening questions in step 1102. The preferred format of the screening question summary screen is shown in FIG. 6E. In addition to the status of the screening questions, the three function touch-areas "review", "review unanswered", and "start exam" are displayed. If it is determined in step 1106 that the "review" touch-area has been touched the processor obtains the address of the first screening question and re-displays that question and the appropriate answer and function touch-areas.

In step 1110, if the "review unanswered" touch-area is touched, the processor branches to step 1112 and finds the address of the first unanswered screening question, reads the screening question and then re-displays the question and the answer touch-areas and function touch-areas. If neither the "review" touch-area nor "review unanswered" touch-area was touched, then the processor determines in step 1114 whether the "start exam" area was touched, and if not, it continues to display the summary screen. If the "start exam" area was touched, however, the processor checks in step 1116 whether there are any unanswered screening questions. If there are unanswered screening questions, the processor reads and displays the first of the unanswered questions. If there are no unanswered screening questions found in step 1116 then the processor reads the address of the first substantive exam question listed in the randomized loading table. In step 1120 the processor clears the display memory and the display.

In steps 1122, 1124, and 1126 the processor reads a line of text at the address of the first exam question, one character at a time, and loads the characters into the display memory until a control character is encountered. When the control character is detected the string of characters in the display memory is displayed on the display as a line of text of the exam question. The processor then checks whether the line of text just displayed is the last line of text for the question. If it is not, it continues to read and display lines of text by repeating steps 1122, 1124, and 1126. When the end of the question is reached the processor proceeds to step 1128 and reads the next line of text one character at a time until the control character is encountered. In step 1130 the processor checks whether the line of text just read is the start of an answer option. If it is, then in step 1132 the processor displays the text of the first answer option and its associated touch-area. Preferably, the processor also checks for the number of lines displayed and the number of lines left to display. If the number of lines left to display would go beyond the end of the display screen, then the remaining options and touch-areas are not displayed but are held in memory for display on the next screen display.

When a line of text for the answer option is displayed in step 1132 the processor proceeds to step 1134 to check for the end of the answer options. If the last answer option has not been displayed the processor continues reading and displaying lines of answer option text in steps 1128, 1130, and 1132 until the last answer option and associated touch-area has been displayed.

In steps 1136 and 1138 the processor polls the touch screen and waits for the screen to be touched. When it is touched the processor traps and interprets the touch-area by determining the X-Y coordinates of the area touched. In step 1140 the processor determines whether an answer option touch-area has been touched, and if so, the touched area is displayed in reverse video and the candidate response file is updated in step 1142 by writing the value or code corresponding to the answer option touched and then closing the response file. If an answer option area has not been touched, then the processor determines in step 1144 whether the "mark for review" function touch area was touched. If so, the "mark for review" area is displayed in reverse video and a code is written to the candidate response file in step 1146 to identify the question for later review by the examinee.

In step 1148, if the "previous item" touch area was touched then the processor decrements an item pointer in step 1150 and re-displays the immediately preceding question by performing steps 1118 through 1134. The item pointer indicates to the processor the current test item in the randomized loading table file. If the "previous item" area was not touched, the processor determines in step 1152 whether the "next item" touch-area was touched, and if so, it increments the item pointer in step 1154 and proceeds to display the next test question as per steps 1118 through 1134.

When the last exam question has been displayed and answered or marked for review, the processor in step 1156 displays a summary screen as shown in FIG. 6G, showing the status of the exam questions. If any one of the function touch-areas for reviewing either marked questions, unanswered questions, the entire exam, or a specific question is touched in step 1158, the processor in step 1160 goes to the address of the item requested and re-displays the text of the question and the associated answer options. A "summary screen" functional touch-area is also displayed in the question/answer screen as shown in FIG. 6F. If while reviewing an exam question the candidate wishes to return to the summary screen, the candidate can do so by touching the "summary screen" touch-area.

When all items have been reviewed, or if the "end exam" area is touched, the processor closes the exam file and performs certain utilities in step 1170, for example, by reading and storing the battery level. When all of the closing utilities have been performed the processor displays an end message in step 1180 which remains on the touch screen indicating that the exam is finished and that the portable user interactive device 60 should be returned to the test center proctor.

From the foregoing description, it can be seen that the present invention provides an efficient system for administering an examination to an individual user on a microprocessor-controlled portable user interactive device. The system also provides for the administration of candidate screening questions used in the licensing process on the portable user interactive device as well as the potential for the immediate issuance of licenses to successful candidates. It should be recognized that changes or modifications may be made to the above-described embodiments without departing from the broad inventive concept of the invention. For example, the portable user interactive device can be readily programmed not only to administer examinations, but also for use as a private tutorial type of device. It should be understood, therefore, that the present invention is not limited to the particular embodiments disclosed herein, but is intended to cover all modifications and changes which are within the scope and spirit of the appended claims.

What is claimed is:

1. A computer-controlled testing device for administering a test to a user and for processing and displaying information comprising:

(1) an information storage medium for storing information, such information including test questions and answers of the user to the test questions;

(2) a display for displaying output information including the test questions from the information storage medium to the user and for displaying user entry pads at predetermined locations on the display for use in permitting the user to input predetermined information, the user entry pads including:

(i) information entry pads for use in permitting the user to input predetermined items of response information to the information storage medium, said predetermined items of response information including user-selectable answers to a displayed test question, each information entry pad corresponding to respective predetermined items of response information; and (ii) function entry pads for use in permitting the user to input predetermined items of control information to the testing device for selectively controlling the output information displayed to the user, each function entry pad corresponding to respective predetermined items of control information;

(3) a touch screen on the display to enable the user to select an item of predetermined control information for input to the testing device and to select an item of predetermined response information for input to the information storage medium by touching the screen at any selected corresponding user entry pad while such user entry pad is displayed on the display;

(4) control means for controlling the administration of the test to the user and for controlling transfer of information between the information storage medium, the display and the touch screen, the control means including a microprocessor; and (5) a microprocessor memory;

(6) a display controller for controlling operation of the display;

(7) a display controller memory;

(8) a UART connected between the microprocessor and the touch screen for transferring selected predetermined control and response information from the touch screen to the microprocessor;

(9) an input/output decoder connected with the microprocessor to decode addresses from the microprocessor to selectively enable the predetermined control and response information from the touch screen to be transferred through the UART to the microprocessor and to selectively enable the display controller to cause the output information and the user entry pads to be displayed on the display;

(10) a memory decoder connected with the microprocessor to decode addresses from the microprocessor to enable information to be selectively transferred between the microprocessor and the information storage medium, the microprocessor memory, and the display controller memory; and

(11) an internal power source for supplying power for the device.

2. The device in accordance with claim 1 wherein said information storage medium is removable from said device and said device includes a port for connection with said information storage medium, the information storage medium being insertable into and removable from the port, and wherein said internal power source includes a battery and a power supply circuit connected with the battery for providing a source of predetermined voltage potential for the device, the power source including a switch connected between the power supply circuit and the battery to switchably connect and disconnect the battery form the power supply circuit, wherein said switch is actuated to connect the battery with the power supply circuit by the insertion of the information storage medium into the port and the switch is actuated to disconnect the battery from the power supply circuit by the removal of the information storage medium from the port.

3. The device in accordance with claim 2 wherein said switch includes a transistor having main terminals connected between the battery and the power supply circuit and a base connectable with ground by the insertion of the information storage medium into the port to thereby actuate the transistor into conduction to connect the battery with the power supply circuit.

4. The device in accordance with claim 1 wherein said internal power source includes a battery and wherein said device includes a voltage sensing circuit connected with the battery for sensing level of charge on the battery, the voltage sensing circuit producing an output signal representing the level of charge on the battery, said output signal being input to said UART and wherein said microprocessor receives said output signal from said UART to enable the display controller to cause an indicia of the level of charge on the battery to be displayed on the display.

5. The device in accordance with claim 4 wherein said input/output decoder decodes addresses from the microprocessor to enable the UART to transmit the output signal from the voltage sensing circuit to the microprocessor.

6. The device in accordance with claim 4 wherein said voltage sensing circuit includes a voltage to frequency converter having an input means connected with the battery and an output means for producing said output signal, the voltage to frequency converter converting a voltage input representing the level of charge on the battery to the output signal having a frequency dependent on the voltage input.

7. The device in accordance with claim 1 wherein said power source includes a battery and a power supply circuit connected with the battery for supplying a source of DC voltage potential and wherein said device includes a back light for back lighting the display and a lighting supply circuit connected with the power supply circuit and the back light to light said back light, said lighting supply circuit including a DC to AC converter for converting the DC voltage potential from the power supply circuit to an AC voltage for supply to said back light and wherein said lighting supply circuit includes a voltage regulator circuit connected between the power supply circuit and said DC to AC converter, the voltage regulator circuit being actuated by a switch signal from said UART.

8. The device in accordance with claim 1 wherein said internal power source includes a rechargeable battery and wherein said device includes a battery charging circuit connected with the rechargeable battery, the battery charging circuit having external contacts for connection with a source of charging potential, said battery charging circuit having a charge control circuit connected between said rechargeable battery and said external contacts to permit dual level charging of the rechargeable battery such that the charge control circuit permits full charging of the rechargeable battery when the rechargeable battery is at a low level of charge and a trickle charge to the rechargeable battery when the battery has become fully charged.

9. The device in accordance with claim 8 wherein said charging circuit includes an indicator for indicating when the rechargeable battery is being charged by the charging circuit.

10. The device in accordance with claim 1 wherein said power source includes a battery and a power supply circuit connected with the battery for supplying a source of positive DC voltage potential and wherein said display permits information to be displayed at variable intensity and wherein said device includes an intensity adjustment circuit connected with the display, the intensity adjustment circuit including a manual adjustment means to enable the user to selectively vary the intensity of displayed information and wherein said device includes a lighting supply circuit receiving said positive DC voltage potential and having a positive to negative voltage inverter circuit connected between the power supply circuit and the intensity adjustment circuit to convert the positive DC voltage potential to a negative DC voltage potential so that a negative DC voltage potential is supplied to said intensity adjustment circuit, and wherein said manual adjustment means includes a manually adjustable variable resistor and an adjustable negative voltage regulator responsive to the variable resistor, the negative voltage regulator receiving said negative DC voltage potential from said positive to negative voltage inverter circuit and producing an output voltage signal dependent on the variable resistor for supply to the display to permit intensity adjustment of displayed information.

11. The device in accordance with claim 10 wherein said lighting supply circuit includes a voltage regulator circuit connected between the power supply circuit and the positive to negative voltage inverter circuit and actuated by a switch signal from said UART.

12. The device in accordance with claim 1 wherein the information storage medium stores the test to be administered to the user, the test including a plurality of test items stored in a selected order in a test file on the information storage medium, each test item including one of the test questions and at least two answer-options associated with the test question, and wherein the information entry pads include answer entry pads corresponding to the answer-options and wherein said control means includes:

A. means for effecting a display of a test item on the display including the test question and the associated answer-options, and the answer entry pads corresponding to the answer-options;
  B. means for determining whether one of the answer entry pads was touched on the touch screen; and
  C. means for enabling a response code corresponding to the answer entry pad which has been touched to be stored in a response file in said information storage medium.

13. The device in accordance with claim 12 wherein the control means includes:

A. means for effecting a display of a mark-for-review function entry pad on the display for permitting the user to mark a test item for later review;
  B. means for determining whether the mark-for-review function entry pad was touched on the touch screen; and
  C. means for enabling a review code to be stored in the response file in said information storage medium when the mark-for-review function entry pad has been touched so that the displayed test item is marked for later review.

14. The device in accordance with claim 13 wherein the control means includes:
  A. means for effecting a display of a review-marked-items function entry pad for permitting the user to review test items on the display that have been marked for later review;
  B. means for determining whether the review-marked-items function entry pad was touched on the touch screen; and
  C. means for effecting a display of a test item that is marked for review on the display when the review-marked-items function entry pad is touched.

15. The device in accordance with claim 12 wherein the control means includes:
  A. means for effecting a display of a next-item function entry pad on the display for permitting the user to request a display of a next test item relative to the test item on the display;
  B. means for determining whether the next-item function entry pad was touched on the touch screen; and
  C. means for effecting a display of the next test item on the display when the next-item function entry pad is touched so that the user can selectively proceed from one test item to another test item on the display.

16. The device in accordance with claim 12 wherein the test item includes more than one page and said display only displays one page of the test item at a time and wherein the control means includes:
  A. means for effecting a display of a next-page function entry pad on the display for permitting the user to request a display of a next page of the test item relative to the page of the test item on the display;
  B. means for determining whether the next-page function entry pad was touched on the touch screen; and
  c. means for effecting a display of the next page of the test item on the display when the next-item function entry pad is touched so that the user can selectively proceed from one page of a test item to the next page of the test item on the display.

17. The device in accordance with claim 12 wherein the control means includes:
  A. means for effecting a display of a previous-item function entry pad on the display for permitting the user to request a display of a previous test item relative to the test item on the display;
  B. means for determining whether the previous-item function entry pad was touched on the touch screen; and
  C. means for effecting a display of the previous test item on the display when the previous-item function entry pad is touched sot hat the user can selectively return to the previous test item on the display.

18. The device in accordance with claim 12 wherein the test item includes more than one page and the display only displays one page of the test item at a time and wherein the control means includes:
  A. means for effecting a display of a previous-page function entry pad on the display for permitting the user to request a display of a previous page of the test item relative to the page of the test item on the display;
  B. means for determining whether the previous-page function entry pad was touched on the touch screen; and
  C. means for effecting a display of the previous page of the test item on the display when the previous-page function entry pad is touched so that the user can selectively return to the previous page of the test item on the display.

19. The device in accordance with claim 12 wherein the control means includes:
  A. means for effecting a display of a review-specific-question function entry pad on the display for permitting the user to review a specific test item on the display;
  B. means for effecting a display of a number entry pad on the display to permit the user to enter a number for the specific test item to be reviewed;
  C. means for determining whether the review-specific-question function entry pad was touched on the touch screen;
  D. means for determining whether the number entry pad was touched on the touch screen; and
  E. means for effecting a display of the test item corresponding to the number that was touched on the number entry pad when the review-specific-question function entry pad and the number entry pad are touched in sequence by the user.

20. The device in accordance with claim 12 wherein the control means includes:
  A. means for generating a random sequence for displaying test items different from the selected order in which said test items are stored in the test file on the information storage medium; and
  B. means for retrieving each test item from said information storage medium for display on the display in the random sequence.

21. The device in accordance with claim 20 wherein the means for generating the random sequence for displaying the test items includes:
  A. means for reading a starting base number from the response file on the information storage medium; and
  B. means for generating a reproducible randomized sequence of numbers based on said starting base number, said test items being displayed according to the generated randomized sequence of numbers.

22. The device in accordance with claim 21 wherein the control means includes:
  A. means to enable storage of a memory address corresponding to a storage location of each test item in the test file such that the memory addresses of all the test items are stored in the generated randomized sequence of numbers;
  B. means for reading each of said memory addresses according to the generated randomized sequence of numbers; and
  C. means for accessing each test item stored in the storage location as its memory address is read.

23. The device in accordance with claim 20 wherein the control means includes:
  A. means for determining if the test becomes inadvertently terminated during administration of the test;
  B. means for determining the test item in the random sequence which was last answered when the test became inadvertently terminated; and
  C. means for effecting a display of the test item in the random sequence following the item answered last if the test was inadvertently terminated.

24. The device in accordance with claim 12 wherein the information storage medium stores a reference identification code corresponding to a valid identification code for a particular user and wherein the control means includes:
   A. means for displaying character entry pads on the display to permit entry of a sequence of characters on the touch screen;
   B. means for determining whether any character entry pads were touched;
   C. means for determining which character entry pads were touched and an order in which such character entry pads were touched so as to generate an input sequence of characters; and
   D. means for comparing the input sequence of characters to the reference identification code to determine whether the input sequence of characters defines a valid identification code.

25. The device in accordance with claim 1 wherein the test questions include screening questions for soliciting personal information about the user to establish the user's personal qualifications to be issued a license if the user passes the test and wherein the answers of the user to the test questions include answers of the user to the screening questions and wherein the control means includes means for controlling transfer of screening questions from the information storage medium to the display for display to the user and for controlling transfer of the answers of the user to the screening questions input at the touch screen to the information storage medium.

26. The device in accordance with claim 1 wherein the control means includes:
   A. timer means for providing a predetermined time period for the user to take the test and for terminating the test at the end of the predetermined time period; and
   B. warning means for providing a warning signal to the user at a selected time from the end of the predetermined time period to warn the user that the test will terminate upon expiration of the selected time.

27. The device in accordance with claim 26 wherein the warning signal is displayed momentarily on said display at the selected time as a first warning to the user and wherein said warning means provides a second warning signal for display on said display at a second selected time from the end of the predetermined time period as a second warning to the user, the second warning signal being continuously displayed on the display until the test terminates.

28. A computer-controlled portable testing device for administering a test to a user and for processing and displaying information comprising;
   A. an information storage medium for storing information including test questions and answers of the user to the test questions, the information storage medium storing the test to be administered to the user, the test including a plurality of test items stored in a selected order in a test file on the information storage medium, each test item including one of the test questions and at least two answer-options associated with the test questions;
   B. a display for displaying information to the user including the test items from the information storage medium;
   C. input means to enable the user to input information to the testing device and to input the answers of the user to the test questions to the information storage medium;
   D. control means for controlling the administration of the test to the user and for controlling transfer of information between the information storage medium, the display, and the input means, said control means including:
      (i) means for effecting a display of a test item on the display;
      (ii) means for determining whether the user has selected one of the answer-options to the test question of the displayed test item as the user's answer to the test question of the displayed test item;
      (iii) means for enabling a response code corresponding to the selected answer-option to the test question of the displayed test item to be stored in a response file on said information storage medium;
      (iv) means for generating a random sequence for displaying the test items different from the selected order in which said test items are stored in the test file on the information storage medium including:
         a. means for reading a starting base number from the response file on the information storage medium; and
         b. means for generating a reproducible randomized sequence of numbers based on said starting base number, said test items being displayed according to the generated randomized sequence of numbers; and
      (v) means for retrieving each test item from said information storage medium for display on the display in the random sequence; and
   E. an internal power source for supplying power for the testing device.

29. The device in accordance with claim 28 wherein the control means includes:
   A. means to enable storage of a memory address corresponding to a storage location of each test item in the test file such that the memory addresses of all the test items are stored according to the generated randomized sequence of numbers;
   B. means for reading each of said memory addresses according to the generated randomized sequence of numbers; and
   C. means for accessing each test item stored in the storage location as its memory address is read.

30. A computer-controlled portable testing device for administering a test to a user and for processing and displaying information comprising;
   A. an information storage medium for storing information including test questions and answers of the user to the test questions, the information storage medium storing the test to be administered to the user, the test including a plurality of test items stored in a selected order in a test file on the information storage medium, each test item including one of the test questions and at least two answer-options associated with the test question;
   B. a display for displaying information to the user including the test items from the information storage medium;
   C. input means to enable the user to input information to the testing device and to input the answers of the user to the test questions to the information storage medium;

D. control means for controlling the administration of the test to the user and for controlling transfer of information between the information storage medium, the display, and the input means, said control means including:
  (i) means for effecting a display of a test item on the display;
  (ii) means for determining whether the user has selected one of the answer-options to the test question of the displayed test item as the user's answer to the test question of the displayed test item;
  (iii) means for enabling a response code corresponding to the selected answer-option to the test question of the displayed test item to be stored in a response file on said information storage medium;
  (iv) means for generating a random sequence for displaying the test items different from the selected order in which said test items are stored in the test file on the information storage medium; and
  (v) means for retrieving each test item from said information storage medium for display on the display in the random sequence;
  (vi) means for determining if the test becomes inadvertently terminated during administration of the test;
  (vii) means for determining the test item in the random sequence which has last answered when the test became inadvertently terminated; and
  (viii) means for effecting a display of the test item in the random sequence following the test item answered last if the test was inadvertently terminated; and
E. an internal power source for supplying power for the testing device.

31. A computer-controlled portable testing device for administering a test to a user and for processing and displaying information comprising:
  A. an information storage medium for storing information including test questions and answers of the user to the test questions, said information storage medium being removable from said device;
  B. a display for displaying output information including the test questions from the information storage medium to the user and for displaying user entry pads at predetermined locations on the display for use in permitting the user to input predetermined information, the user entry pads including:
    (i) information entry pads for use in permitting the user to input predetermined items of response information to the information storage medium, said predetermined items of response information including user-selectable answers to a displayed test question, each information entry pad corresponding to respective predetermined items of response information; and
    (ii) function entry pads for use in permitting the user to input predetermined items of control information to the testing device for selectively controlling the output information displayed to the user, each function entry pad corresponding to respective predetermined items of control information;
  C. a touch screen on the display to enable the user to select an item of predetermined control information for input to the testing device and to select an item of predetermined response information for input to the information storage medium by touching the screen at any selected corresponding user entry pad while such user entry pad is displayed on the display;
  D. control means for controlling the administration of the test to the user and for controlling transfer of information between the information storage medium, the display and the touch screen;
  E. a port for connection with said information storage medium, the information storage medium being insertable into and removable from the port; and
  F. an internal power source for supplying power for the device, the internal power source including a battery and a power supply circuit connected with the battery for providing a source of predetermined voltage potential for the device, the power source including a switch connected between the power supply circuit and the battery to switchably connect and disconnect the battery from the power supply circuit, wherein said switch is actuated to connect the battery with the power supply circuit by the insertion of the information storage medium into the port and the switch is actuated to disconnect the battery from the power supply circuit by the removal of the information storage medium from the port.

32. The device in accordance with claim 31 wherein said switch includes a transistor having main terminals connected between the battery and the power supply circuit and a base connectable with ground by the insertion of the information storage medium into the port to thereby actuate the transistor into conduction to connect the battery with the power supply circuit.

33. A computer-controlled portable testing device for administering a test to a user and for processing and displaying information comprising;
  A. an information storage medium for storing information including test questions and answers of the user to the test questions;
  B. a display for displaying output information including the test questions from the information storage medium to the user and for displaying user entry pads at predetermined locations on the display for use in permitting the user to input predetermined information, the user entry pads including:
    (i) information entry pads for use in permitting the user to input predetermined items of response information to the information storage medium, said predetermined items of response information including user-selectable answers to a displayed test question, each information entry pad corresponding to respective predetermined items of response information; and
    (ii) function entry pads for use in permitting the user to input predetermined items of control information to the testing device for selectively controlling the output information displayed to the user, each function entry pad corresponding to respective predetermined items of control information;
  C. a touch screen on the display to enable the user to select an item of predetermined control information for input to the testing device and to select an item of predetermined response information for input to the information storage medium by touching the screen at any selected corresponding user entry pad while such user entry pad is displayed on the display;

D. control means for controlling the administration of the test to the user and for controlling transfer of information between the information storage medium, the display and the touch screen; and E. an internal power source for supplying power for the device including a rechargeable battery and a battery charging circuit connected with the rechargeable battery, the battery charging circuit having external contacts for connection with a source of charging potential, said battery charging circuit having a charge control circuit connected between said rechargeable battery and said external contacts to permit dual level charging of the rechargeable battery such that the charge control circuit permits full charging of the rechargeable battery when the rechargeable battery is at a low level of charge and a trickle charge to the rechargeable battery when the battery has become fully charged.

34. The device in accordance with claim 33 wherein said battery charging circuit includes an indicator for indicating when the rechargeable battery is being charged by the battery charging circuit.

35. A computer-controlled portable testing device for administering a test to a user and for processing and displaying information comprising;

A. an information storage medium for storing information including test questions and answers of the user to the test questions, the test including a plurality of test items stored in a selected order in a test file on the information storage medium, each test item including one of the test questions and at least two answer-options associated with the test question;

B. a display for displaying output information including the test questions from the information storage medium to the user, said display only displaying one page at a time of any test item having more than one page, and for displaying user entry pads at predetermined locations on the display for use in permitting the user to input predetermined information, the user entry pads including:

(i) information entry pads for use in permitting the user to input predetermined items of response information to the information storage medium, said predetermined items of response information including user-selectable answers to a displayed test question, each information entry pad corresponding to respective predetermined items of response information, the information entry pads including answer entry pads corresponding to the answer-options; and (ii) function entry pads for use in permitting the user to input predetermined items of control information to the testing device for selectively controlling the output information displayed to the user, each function entry pad corresponding to respective predetermined items of control information;

C. a touch screen on the display to enable the user to select an item of predetermined control information for input to the testing device and to select an item of predetermined response information for input to the information storage medium by touching the screen at any selected corresponding user entry pad while such user entry pad is displayed on the display;

D. control means for controlling the administration of the test to the user and for controlling transfer of information between the information storage medium, the display and the touch screen including:

(i) means for effecting a display of a test item on the display including the test question and the associated answer-options, and the answer entry pads corresponding to the answer-options;

(ii) means for determining whether one of the answer entry pads was touched on the touch screen;

(iii) means for enabling a response code corresponding to the answer entry pad which has been touched to be stored in a response file in said information storage medium;

(iv) means for effecting a display of a next-page function entry pad on the display for permitting the user to request a display of a next page of the test item relative to the page of the test item on the display;

(v) means for determining whether the next-page function entry pad was touched on the touch screen; and (vi) means for effecting a display of the next page of the test item on the display when the next-page function entry pad is touched so that the user can selectively proceed from one page of a test item to the next page of the test item on the display; and E. an internal power source for supplying power for the device.

36. A computer-controlled portable testing device for administering a test to a user and for processing and displaying information comprising;

A. an information storage medium for storing information including test questions and answers of the user to the test questions, the test including a plurality of test items stored in a selected order in a test file on the information storage medium, each test item including one of the test questions and at least two answer-options associated with the test question;

B. a display for displaying output information including the test questions from the information storage medium to the user, said display only displaying one page at a time of any test item having more than one page, and for displaying user entry pads at predetermined locations on the display for use in permitting the user to input predetermined information, the user entry pads including:

(i) information entry pads for use in permitting the user to input predetermined items of response information to the information storage medium, said predetermined items of response information including user-selectable answers to a displayed test question, each information entry pad corresponding to respective predetermined items of response information, the information entry pads including answer entry pads corresponding to the answer-options; and (ii) function entry pads for use in permitting the user to input predetermined items of control information to the testing device for selectively controlling the output information displayed to the user, each function entry pad corresponding to respective predetermined items of control information;

C. a touch screen on the display to enable the user to select an item of predetermined control information for input to the testing device and to select an item of predetermined response information for input to the information storage medium by touching the screen at any selected corresponding user entry pad while such user entry pad is displayed on the display;

D. control means for controlling the administration of the test to the user and for controlling transfer of information between the information storage medium, the display and the touch screen including:
   (i) means for effecting a display of a test item on the display including the test question and the associated answer-options, and the answer entry pads corresponding to the answer-options;
   (ii) means for determining whether one of the answer entry pads was touched on the touch screen;
   (iii) means for enabling a response code corresponding to the answer entry pad which has been touched to be stored in a response file in said information storage medium;
   (iv) means for effecting a display of a previous-page function entry pad on the display for permitting the user to request a display of a previous page of the test item relative to the page of the test item on the display;
   (v) means for determining whether the previous-page function entry pad was touched on the touch screen;
   (vi) means for effecting a display of the previous page of the test item on the display when the previous-page function entry pad is touched so that the user can selectively return to the previous page of the test item on the display; and E. an internal power source for supplying power for the device.

37. A computer-controlled portable testing device for administering a test to a user and for processing and displaying information comprising:

A. an information storage medium for storing information including test questions and answers of the user to the test questions, the test including a plurality of test items stored in a selected order in a test file on the information storage medium, each test item including one of the test questions and at least two answer-options associated with the test question;

B. a display for displaying output information including the test questions from the information storage medium to the user and for displaying user entry pads at predetermined locations on the display for use in permitting the user to input predetermined information, the user entry pads including:
   (i) information entry pads for use in permitting the user to input predetermined items of response information to the information storage medium, said predetermined items of response information including user-selectable answers to a displayed test question, each information entry pad corresponding to respective predetermined items of response information, the information entry pads including answer entry pads corresponding to the answer-options; and
   (ii) function entry pads for use in permitting the user to input predetermined items of control information to the testing device for selectively controlling the output information displayed to the user, each function entry pad corresponding to respective predetermined items of control information;

C. a touch screen on the display to enable the user to select an item of predetermined control information for input to the testing device and to select an item of predetermined response information for input to the information storage medium by touching the screen at any selected corresponding user entry pad while such user entry pad is displayed on the display;

D. control means for controlling the administration of the test to the user and for controlling transfer of information between the information storage medium, the display and the touch screen including:
   (i) means for effecting a display of a test item on the display including the test question and the associated answer-options, and the answer entry pads corresponding to the answer-options;
   (ii) means for determining whether one of the answer entry pads was touched on the touch screen;
   (iii) means for enabling a response code corresponding to the answer entry pad which has been touched to be stored in a response file in said information storage medium;
   (iv) means for generating a random sequence for displaying test items different from the selected order in which said test items are stored in the test file on the information storage medium including:
      a. means for reading a starting base number from the response file on the information storage medium; and
      b. means for generating a reproducible randomized sequence of numbers based on said starting base number, said test items being displayed according to the generated randomized sequence of numbers; and
   (v) means for retrieving each test item from said information storage medium for display on the display in the random sequence; and E. an internal power source for supplying power for the device.

38. The device in accordance with claim 37 wherein the control means includes:
   A. means to enable storage of a memory address corresponding to a storage location of each test item in the test file such that the memory addresses of all the test items are stored in the generated randomized sequence of numbers;
   B. means for reading each of said memory addresses according to the generated randomized sequence of numbers; and
   C. means for accessing each test item stored in the storage location as its memory address is read.

39. A computer-controlled portable testing device for administering a test to a user and for processing and displaying information comprising;
   A. an information storage medium for storing information including test questions and answers of the user to the test questions, the test including a plurality of test items stored in a selected order in a test file on the information storage medium, each test item including one of the test questions and at least two answer-options associated with the test question;

B. a display for displaying output information including the test questions from the information storage medium to the user and for displaying user entry pads at predetermined locations on the display for use in permitting the user to input predetermined information, the user entry pads including:

(i) information entry pads for use ni permitting the user to input predetermined items of response information to the information storage medium, said predetermined items of response information including user-selectable answers to a displayed test question, each information entry pad corresponding to respective predetermined items of response information, the information entry pads including answer entry pads corresponding to the answer-options; and (ii) function entry pads for use in permitting the user to input predetermined items of control information to the testing device for selectively controlling the output information displayed to the user, each function entry pad corresponding to respective predetermined items of control information;

C. a touch screen on the display to enable the user to select an item of predetermined control information for input to the testing device and to select an item of predetermined response information for input to the information storage medium by touching the screen at any selected corresponding user entry pad while such user entry pad is displayed on the display;

D. control means for controlling the administration of the test to the user and for controlling transfer of information between the information storage medium, the display and the touch screen including:

(i) means for generating a random sequence for displaying test items different from the selected order in which said test items are stored in the test file on the information storage medium;

(ii) means for retrieving each test item from said information storage medium for display on the display in the random sequence;

(iii) means for effecting a display of a test item on the display including the test question and the associated answer-options, and the answer entry pads corresponding to the answer-options;

(iv) means for determining whether one of the answer entry pads was touched on the touch screen;

(v) means for enabling a response code corresponding to the answer entry pad which has been touched to be stored in a response file in said information storage medium;

(vi) means for determining if the test becomes inadvertently terminated during administration of the test;

(vii) means for determining the test item in the random sequence which was last answered when the test became inadvertently terminated; and (viii) means for effecting a display of the test item in the random sequence following the item answered last if the test was inadvertently terminated; and E. an internal power source for supplying power for the device.

40. A computer-controlled portable testing device for administering a test to a user and for processing and displaying information comprising:

a. an external port;

B. an information storage medium for storing information including test questions and answers of the user to the test questions, said information storage medium being insertable into and removable from the external port;

C. a display for displaying information to the user including the test questions form the information storage medium;

D. input means to enable the user to input information to the testing device and to input the answers of the user to the test questions to the information storage medium;

E. control means for controlling the administration of the test to the user and for controlling transfer of information between the information storage medium, the display, and the input means; and F. power supply means for supplying power for the testing device, the power supply means including power source means for providing a source of voltage potential to the device and a switch for operably connecting and disconnecting the power source means to respectively turn the device on and off, the switch being operably connected wit the external port so that insertion of the information storage medium into the external port actuates the switch to turn the device on and removal of the information storage medium from the external port actuates the switch to turn the device off.

41. The device in accordance with claim 40 wherein the power source means includes an internal battery and a power supply circuit connectable with the battery for supplying voltage potential from the battery to the device and wherein the switch includes a transistor having main terminals connected between the power supply circuit and the battery and a base connectable to and disconnectable from a selected voltage potential by the respective insertion and removal of the information storage medium to and from the external port whereby the insertion of the information storage medium into the external port actuates the transistor into conduction to connect the battery with the power supply circuit.

42. A computer-controlled portable testing device for administering a test to a user and for processing and displaying information comprising:

A. an information storage medium for storing information including test questions and answers of the user to the test questions;

B. a display for displaying information to the user including the test questions from the information storage medium;

C. input means to enable the user to input information to the testing device and to input the answers of the user to the test questions to the information storage medium;

D. control means for controlling the administration of the test to the user and for controlling transfer of information between the information storage medium, the display, and the input means, the control means including:

(i) timer means for providing a predetermined time period for the user to take the test and for terminating the test at the end of the predetermined time period; and (ii) warning means for providing a warning signal to the user at a selected time from the end of the predetermined time period to warn the user that the test will terminate upon expiration of the selected time wherein the warning signal is displayed momentarily on said display at the selected time as a first warning to the user and wherein said warning means provides a second warning signal for display on said display at a second selected time form the end of the predetermined time period as a second warning to the user, the second warning signal being continuously displayed on the display until the test terminates.

* * * * *